United States Patent
Jin

(10) Patent No.: US 11,711,625 B2
(45) Date of Patent: Jul. 25, 2023

(54) PIXEL ARRAY AND IMAGE SENSOR INCLUDING THE SAME

(71) Applicant: SAMSUNG ELECTRONICS CO., LTD., Suwon-si (KR)

(72) Inventor: Younggu Jin, Osan-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/540,491

(22) Filed: Dec. 2, 2021

(65) Prior Publication Data

US 2022/0337766 A1   Oct. 20, 2022

(30) Foreign Application Priority Data

Apr. 20, 2021  (KR) .................... 10-2021-0051358

(51) Int. Cl.
| | | |
|---|---|---|
| *H04N 5/3745* | (2011.01) | |
| *H04N 25/53* | (2023.01) | |
| *H04N 25/74* | (2023.01) | |
| *H04N 25/75* | (2023.01) | |
| *H04N 25/771* | (2023.01) | |

(52) U.S. Cl.
CPC ............ *H04N 25/53* (2023.01); *H04N 25/74* (2023.01); *H04N 25/75* (2023.01); *H04N 25/771* (2023.01)

(58) Field of Classification Search
None
See application file for complete search history.

(56) References Cited

U.S. PATENT DOCUMENTS

| | | | |
|---|---|---|---|
| 7,781,716 B2 | 8/2010 | Anderson et al. | |
| 10,263,022 B2 | 4/2019 | Wan et al. | |
| 10,510,796 B1 | 12/2019 | Wang et al. | |
| 10,791,292 B1* | 9/2020 | Geurts | ........... H04N 5/379 |
| 2016/0260757 A1 | 9/2016 | Sakano | |
| 2018/0054579 A1* | 2/2018 | Kumagai | ............ H04N 5/3594 |
| 2020/0013811 A1* | 1/2020 | Jin | .................... H01L 27/14812 |
| 2020/0029047 A1 | 1/2020 | Jin et al. | |
| 2020/0204753 A1* | 6/2020 | Sugizaki | ............ H04N 5/37457 |
| 2020/0286938 A1 | 9/2020 | Jin et al. | |

FOREIGN PATENT DOCUMENTS

| | | |
|---|---|---|
| EP | 3609176 A1 | 2/2020 |
| KR | 10-2020-0009643 A | 1/2020 |

* cited by examiner

*Primary Examiner* — Mark T Monk
(74) *Attorney, Agent, or Firm* — Lee IP Law, P.C.

(57) ABSTRACT

Provided are a pixel array and an image sensor including the same. The pixel array includes a plurality of sub-pixels adjacent to each other and a readout circuit connected to the plurality of sub-pixels through a floating diffusion node. Each of the sub-pixels includes a photoelectric conversion element, an overflow transistor connected to the photoelectric conversion element, a phototransistor connected to the photoelectric conversion element and the overflow transistor, and a storage element connected to the phototransistor.

20 Claims, 30 Drawing Sheets

PIXEL ARRAY AND IMAGE SENSOR INCLUDING THE SAME

CROSS-REFERENCE TO RELATED APPLICATION

This application is based on and claims priority under 35 U.S.C. § 119 to Korean Patent Application No. 10-2021-0051358, filed on Apr. 20, 2021, in the Korean Intellectual Property Office, the disclosure of which is incorporated by reference herein in its entirety.

BACKGROUND

1. Field

Embodiments relate to an electronic device, and more particularly, to a pixel array and an image sensor including the same.

2. Description of the Related Art

Due to the increasing usage of digital cameras, digital camcorders, and mobile phones including functions thereof, image sensors are rapidly developing. An image sensor may be a semiconductor device configured to convert an optical image into an electric signal.

SUMMARY

Embodiments are directed to a pixel array, including: a plurality of sub-pixels adjacent to each other and a readout circuit connected to the plurality of sub-pixels through a floating diffusion node. Each of the plurality of sub-pixels may include: a photoelectric conversion element configured to accumulate photocharges generated due to reflected light that is incident thereto; an overflow transistor connected to the photoelectric conversion element; a phototransistor connected to the photoelectric conversion element and the overflow transistor; and a storage element connected to the phototransistor. The readout circuit may include: a reset transistor connected to the floating diffusion node; a driver transistor including a gate electrode connected to the floating diffusion node; and a selection transistor connected to the driver transistor.

Embodiments are directed to an image sensor, including: a row decoder configured to generate an overflow gate signal; a pixel array including first to fourth sub-pixels; and a photogate controller configured to provide a plurality of photogate signals to the first to fourth sub-pixels. Each of the first to fourth sub-pixels may include: a photoelectric conversion element configured to accumulate photocharges generated due to reflected light that is reflected by an object; a storage element configured to accumulate the photocharges accumulated in the photoelectric conversion element; an overflow transistor configured to provide a power supply voltage to the photoelectric conversion element in response to the overflow gate signal; and a phototransistor configured to electrically connect the photoelectric conversion element to the storage element in response to a photogate signal that is previously determined according to a position of a sub-pixel, from among the plurality of photogate signals. The photogate controller may provide first to fourth photogate signals having respectively different phase differences of 0°, 90°, 180°, and 270° with respect to modulated light incident to the object to the first to fourth sub-pixels, respectively, during an integration period.

Embodiments are directed to an image sensor, including: a row decoder configured to generate an overflow gate signal and a shutter control signal; a photogate controller configured to generate a photogate signal; a pixel array including first sub-pixels connected to a first floating diffusion node, a first readout circuit connected to the first floating diffusion node, second sub-pixels connected to a second floating diffusion node, and a second readout circuit connected to the second floating diffusion node; and a signal processor configured to generate a color image and a depth image of an object, based on a plurality of pixel signals output by the pixel array. At least one of the first sub-pixels may include a color pixel configured to generate a pixel signal for the color image, and at least one of the second sub-pixels may include a distance pixel configured to generate a pixel signal for the depth image. Each of the color pixel and the distance pixel may include: a photoelectric conversion element configured to accumulate photocharges generated due to reflected light reflected from the object; a storage element configured to accumulate photocharges accumulated in the photoelectric conversion element; an overflow transistor configured to provide a power supply voltage to the photoelectric conversion element in response to the overflow gate signal; a phototransistor configured to provide the photocharges accumulated in the photoelectric conversion element, to the storage element, in response to the photogate signal; and a shutter transistor configured to electrically connect the phototransistor to the storage element in response to the shutter control signal. The photogate signal may be at a turn-on level during an integration period.

BRIEF DESCRIPTION OF THE DRAWINGS

Features will become apparent to those of skill in the art by describing in detail example embodiments with reference to the attached drawings in which.

DETAILED DESCRIPTION

An image sensor may include an array of pixels or small photodiodes called photo sites, which in general do not directly convert photons into electrons from broad spectrum light, but instead are combined with color filters to convert only photons corresponding to a specific color of the broad spectrum light into electrons. In this regard, the pixel of the image sensor may be intended to receive only light of a specific color band of the broad spectrum light. The pixel of the image sensor may be combined with the color filter and convert only photons corresponding to the specific color into electrons so that the image sensor may obtain color images.

Information about a distance between an object and the image sensor can be used to obtain a depth image (or a distance image) using the image sensor. An image reconstructed based on the distance between the object and the image sensor, e.g., by using a time of flight (TOF), may be expressed as a depth image.

Figure 1:
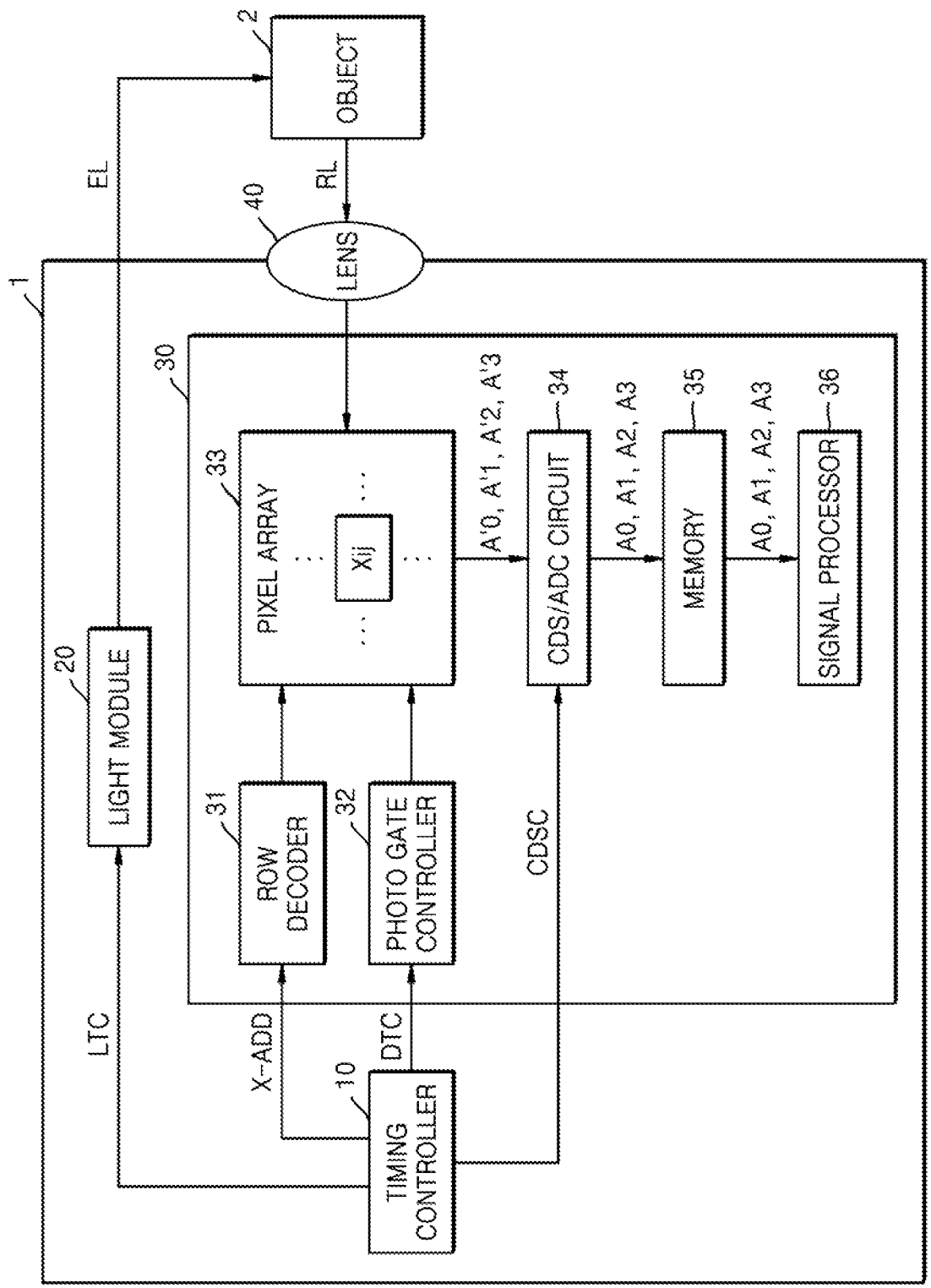
FIG. 1 is a diagram of an image sensor according to an example embodiment.

FIG. 1 is a diagram of an image sensor 1 according to an example embodiment.

Referring to FIG. 1, the image sensor 1 may be applied to a camera, a camcorder, multimedia, optical communication (fiber, free space, etc.), laser detection and ranging (LI-DAR), an infrared (IR) microscope, an IR telescope, and the like. In addition, the image sensor 1 may be applied in various fields of a body heat image diagnosis device, an environmental monitoring system (e.g., an unmanned product monitor and a marine pollution monitor), a temperature monitoring system in semiconductor process lines, a building insulation & leak detection system, an electrical/electronic printed circuit board (PCB) circuit, and a component inspection system.

The image sensor 1 may include a timing controller 10, a light module 20, a distance sensor 30, and a lens 40.

The timing controller 10 may control an operation time point of each of the light module 20 and the distance sensor 30, based on a clock signal transmitted from an external host (or a central processing unit (CPU)) (not shown). For example, the timing controller 10 may generate a light emission control signal LT, based on the clock signal, and transmit the light emission control signal LTC to the light module 20. The timing controller 10 may generate a row address signal X-ADD, a light detection control signal DTC, and a correlated double sampling (CDS) control signal CDSC, based on the clock signal, and transmit the row address signal X-ADD, the light detection control signal DTC, and the CDS control signal CDSC to the distance sensor 30.

The light module 20 may irradiate modulated light EL to an object 2, based on the light emission control signal LTC. The light module 20 may include a light source driver configured to generate a clock signal based on the light emission control signal LTC and a light source configured to emit the modulated light EL based on the clock signal.

The modulated light EL may be, e.g., infrared (IR) light, visible light, white light, or white light-emitting diode (LED) light. When the modulated light EL is incident to the object 2, reflected light RL may be reflected from the object 2 to pass through the lens 40 and be incident to a pixel array 33 included in the distance sensor 30. Each of the modulated light EL and the reflected light RL may be, e.g., a sine wave signal or a square wave signal.

The distance sensor 30 may demodulate the reflected light RL and output an electric signal. The distance sensor 30 may include a row decoder 31, a photogate controller 32, the pixel array 33, a CDS/analog-to-digital converting (ADC) circuit 34, memory 35, and a signal processor 36. In an example embodiment, the distance sensor 30 may be implemented as a complementary metal-oxide semiconductor (CMOS) Image Sensor (CIS) type.

The row decoder 31 may select from a plurality of pixels Xij (i=1 to n, j=1 to m) in the pixel array 33 in units of rows, based on a row address signal X-ADD, and drive the selected pixels. Here, each of n and m may be an integer of 2 or more. The row decoder 31 may decode the row address signal X-ADD, and drive pixels in a specific row, from among the plurality of pixels Xij (i=1 to n, j=1 to m) included in the pixel array 33, based on a decoding result. The row decoder 31 may generate driving signals for driving respective rows of the pixel array 33. The driving signals may include, e.g., an overflow gate signal, a shutter control signal, a storage control signal, a transmission signal, a reset signal, and a selection signal.

The photogate controller 32 may generate a plurality of photogate signals based on the light detection control signal DTC. The plurality of gate signals may be, e.g., first to fourth photogate signals. The first photogate signal may be a signal having a phase difference of 0° with respect to the modulated light EL. The second photogate signal may be a signal having a phase difference of 90° with respect to the modulated light EL. The third photogate signal may be a signal having a phase difference of 180° with respect to the modulated light EL. The fourth photogate signal may be a signal having a phase difference of 270° with respect to the modulated light EL.

The pixel array 33 may include the plurality of pixels Xij (i=1 to n, and j=1 to m), which may be arranged in a matrix form in a plurality of rows and a plurality of columns. As used herein, the term "row" may refer to a set of pixels arranged in a lateral direction in the pixel array 33. As used herein, the term "column" may refer to a set of pixels arranged in a longitudinal direction in the pixel array 33.

Each of the plurality of pixels Xij (i=1 to n, and j=1 to m) may be a pixel having a 1-tap structure. As used herein, the term "tap" may refer to a component including a photogate and a detection region, which may collect and detect photocharges in response to a predetermined demodulation signal. The 1-tap structure may be a structure in which one phototransistor is formed and one photoelectric conversion element is formed in a photoelectric conversion region. By using the pixel having a 1-tap structure, a size of the pixel array 33 may be reduced to improve the integration density of the image sensor 1.

A pixel Xij may detect a phase difference between a phase of the reflected light RL and a phase of the modulated light EL in response to the reflected light RL. A pixel signal indicating information about the detected phase difference may be output. The pixel Xij may include a sub-pixel and a readout circuit.

The plurality of pixels included in the pixel array 33 may generate first to fourth pixel signals A'0, A'1, A'2, and A'3.

A plurality of pixel groups of the pixel array 33 may generate the first to fourth pixel signals A'0, A'1, A'2, and A'3, based on the reflected light RL and a plurality of photogate signals periodically applied with predetermined phase differences. Photocharges may be accumulated in the pixel array 33 for a predetermined integration time, and results of the accumulation of the photocharges may be sequentially output in the order of completion of an operation of accumulating the photocharges. The first to fourth pixel signals A'0, A'1, A'2, and A'3 may be output to the CDS/ADC circuit 34 through bit lines.

In an example embodiment, the first to fourth photogate signals may be sequentially applied to one pixel. In another example embodiment, the first photogate signal may be applied to a first pixel, the second photogate signal may be applied to a second pixel, the third photogate signal may be applied to a third pixel, and the fourth photogate signal may be applied to a fourth pixel, in which case the first to fourth photogate signals may be simultaneously applied to the first to fourth pixels, respectively.

The CDS/ADC circuit 34 may perform a correlated double sampling (CDS) operation on the first to fourth pixel signals A'0, A'1, A'2, and A'3, based on the CDS control signal CDSC, and cancel noise. The CDS/ADC circuit 34 may compare the pixel signals, from which noise is canceled, with a ramp signal output by a ramp generator, and convert analog signals corresponding to comparison results into first to fourth digital pixel signals A0, A1, A2, and A3.

The memory 35 may store the first to fourth digital pixel signals A0, A1, A2, and A3 in units of frames, and provide the first to fourth digital pixel signals A0, A1, A2, and A3, which are stored, to the signal processor 36.

The signal processor 36 may simultaneously generate a color image and a depth image based on the first to fourth digital pixel signals A0, A1, A2, and A3 output by the memory 35.

Figure 2A:
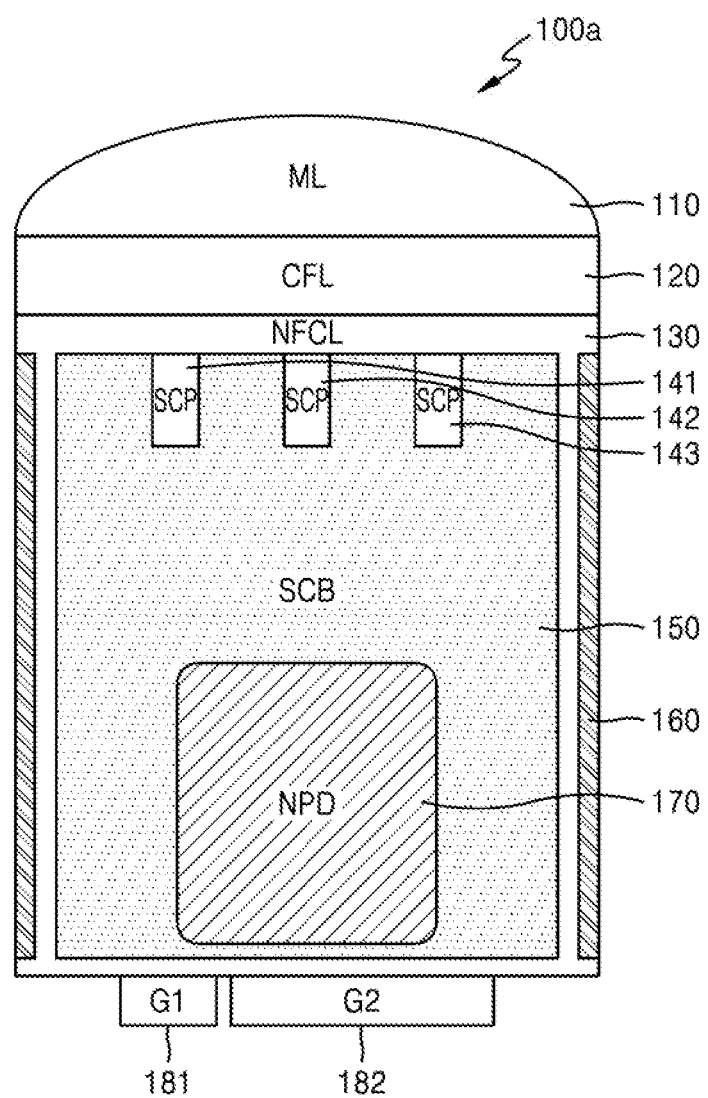
FIGS. 2A and 2B are respective schematic cross-sectional views of a main portion of a pixel included in an image sensor, according to example embodiments.
Figure 2B:
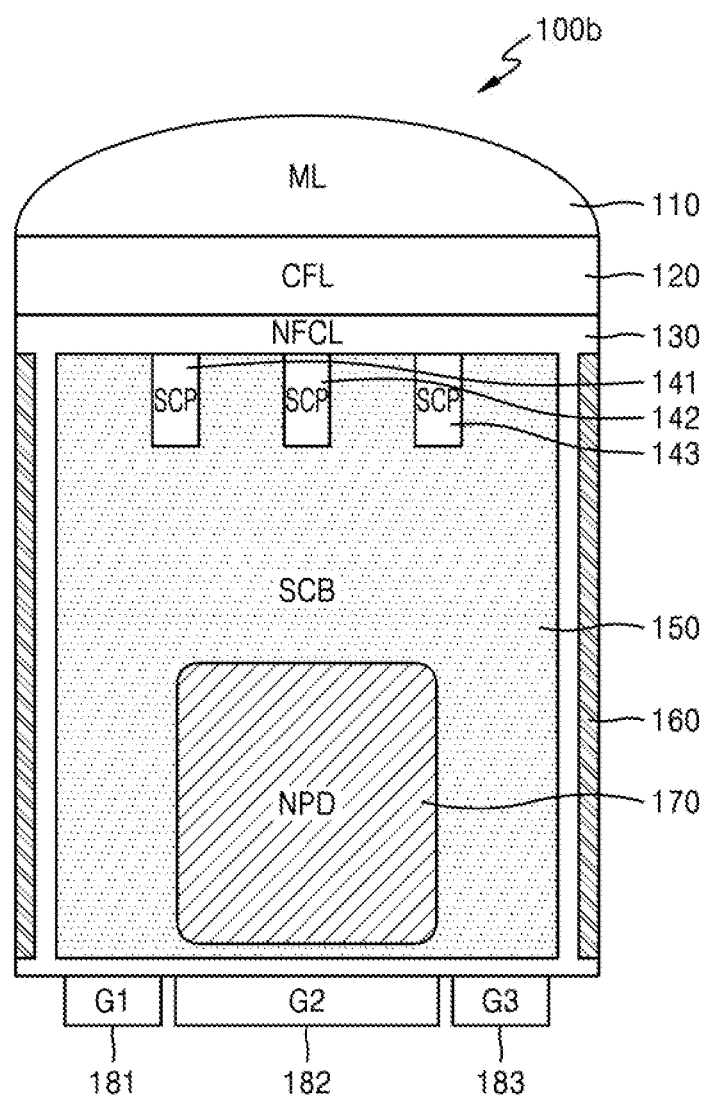

FIGS. 2A and 2B are respective schematic cross-sectional views of a main portion of a pixel included in an image sensor, according to example embodiments.

Referring to FIG. 2A, an image sensor 100a may include a microlens 110 (ML), a color filter layer 120 (CFL), a negative fixed charge layer (NFCL), 130, first to third sensitivity control members 141, 142, and 143 (SCP), a semiconductor substrate 150 (SCB), a deep trench insulator (DTI) structure 160, a photoelectric conversion region 170 (NPD), a first gate 181 (G1), and a second gate 182 (G2).

The microlens 110 may have an arc shape having a curvature or a vertical cross-sectional shape of a partial ellipse.

The color filter layer 120 may be under the microlens 110. The color filter layer 120 may transmit reflected light RL incident through the microlens 110, and allow only light having a predetermined wavelength to be incident to the photoelectric conversion region 170. The color filter layer 120 may form a color filter array. In an example embodiment, to obtain only color images, IR images, or depth images, the color filter layer 120 may be omitted.

The negative fixed charge layer 130 may be under the color filter layer 120. The negative fixed charge layer 130 may include a high-k dielectric material, e.g., hafnium oxide ($HfO_x$), aluminum oxide ($AlO_x$), or zirconium oxide ($ZrO_x$).

The microlens 110, the color filter layer 120, and the negative fixed charge layer 130 may be sequentially stacked on the semiconductor substrate 150. In an example embodiment, the negative fixed charge layer 130 may be in direct contact with the semiconductor substrate 150 and cover one surface of the semiconductor substrate 150. In an implementation, a buffer layer may be further between the microlens 110 and the negative fixed charge layer 130.

The semiconductor substrate 150 may include, e.g., one or more of silicon (Si), germanium (Ge), silicon germanium (SiGe), silicon carbide (SiC), gallium arsenide (GaAs), indium arsenide (InAs), and indium phosphide (InP). In an example embodiment, the semiconductor substrate 150 may have a first conductivity. For example, the first conductivity may be p type.

The semiconductor substrate 150 may include the first to third sensitivity control members 141, 142, and 143 on a surface in contact with the negative fixed charge layer 130. The first to third sensitivity control members 141, 142, and 143 may scatter reflected light RL. Sensitivity to the reflected light RL may be increased due to the first to third sensitivity control members 141, 142, and 143. Although three first to third sensitivity control members 141, 142, and 143 are illustrated, the number of sensitivity control members may be varied. The first to third sensitivity control members 141, 142, and 143 may have a prominence and depression shape and may include an insulating material, such as oxide.

The DTI structure 160 may be on outer side surfaces of the semiconductor substrate 150 or between a plurality of pixels. The DTI structure 160 may include, e.g., an insulating material including oxide, nitride, oxynitride, or a combination thereof. In an example embodiment, the DTI structure 160 may include a conductive material layer and a cover insulating layer surrounding the conductive material layer.

Part of the reflected light RL incident through the microlens 110 may travel toward the photoelectric conversion region 170. Another part of the reflected light RL incident through the microlens 110 may be scattered by the first to third sensitivity control members 141, 142, and 143 and then reflected by the DTI structure 160. Accordingly, a light path of another part of the reflected light RL may be increased, and thus, the absorptance and sensitivity of light in the photoelectric conversion region 170 may be increased.

The photoelectric conversion region 170 may have a second conductivity. For example, the second conductivity may be n type. The photoelectric conversion region 170 may constitute a photoelectric conversion element PD.

In an example embodiment, the photoelectric conversion region 170 may be on a portion of the first gate 181 and a portion of the second gate 182. The first gate 181 may be a gate of an overflow transistor. The second gate 182 may be a gate of a phototransistor.

Referring to FIG. 2B, an image sensor 100b may further include a third gate 183.

The third gate 183 may be a gate of a shutter transistor. In another example embodiment, the photoelectric conversion region 170 included in the image sensor 100b shown in FIG. 2B may be on the second gate 182, e.g., directly above only the second gate 182.

Figure 3A:
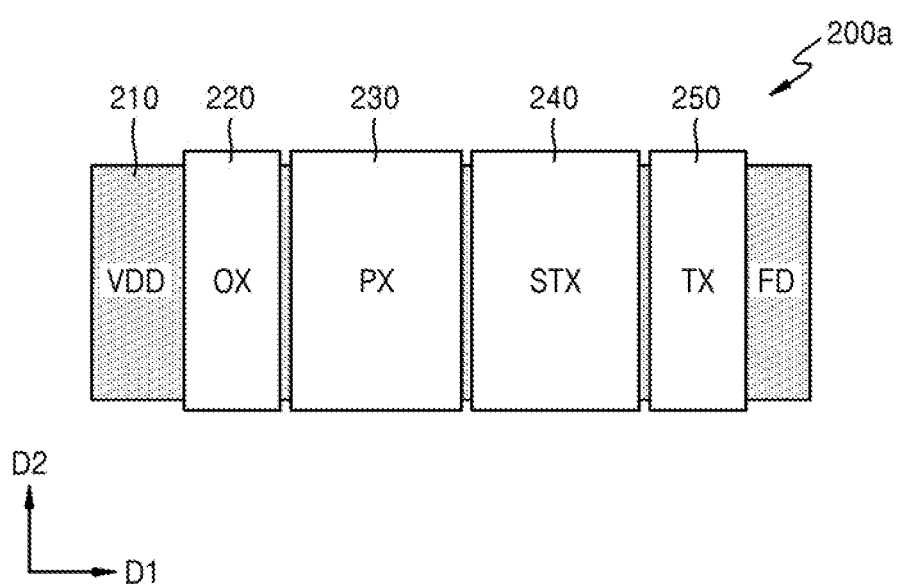
FIGS. 3A to 3C illustrate respective layouts of a main portion of a pixel, according to example embodiments.
Figure 3B:
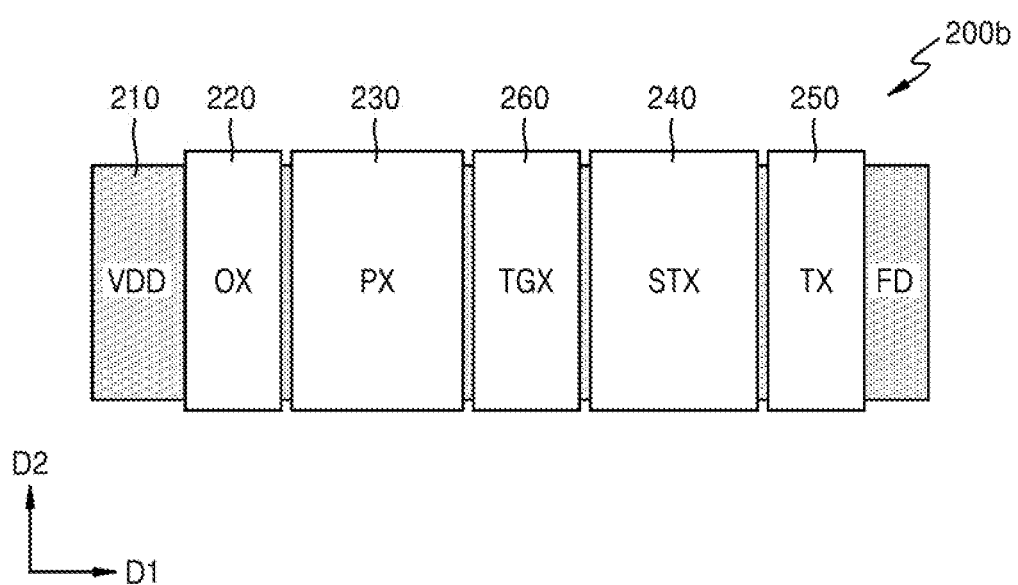
Figure 3C:
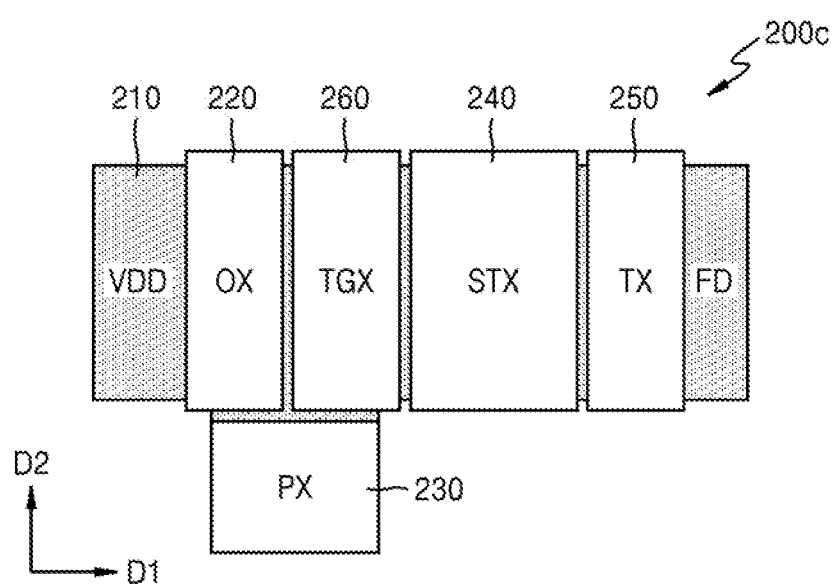

FIGS. 3A to 3C illustrate respective layouts of a main portion of a pixel, according to example embodiments.

Referring to FIG. 3A, a pixel 200a may include a conducting wire 210, an overflow transistor 220 (OX), a phototransistor 230 (PX), a storage transistor 240 (STX), and a transfer transistor 250 (TX).

The conducting wire 210 may extend in a first direction D1. A positive power supply voltage VDD may be provided from one side of the conducting wire 210. The conducting wire 210 may be electrically connected to the overflow transistor 220, the phototransistor 230, the storage transistor 240, and the transfer transistor 250. A floating diffusion node FD may be formed in a portion of the conducting wire 210, which extends from one side of the transfer transistor 250.

In an example embodiment, the overflow transistor 220, the phototransistor 230, the storage transistor 240, and the transfer transistor 250 may be sequentially arranged on the conducting wire 210 in the first direction D1.

Referring to FIG. 3B, a pixel 200b may further include a shutter transistor 260 (TGX).

In an example embodiment, the shutter transistor 260 may be between the phototransistor 230 and the storage transistor 240. The overflow transistor 220, the phototransistor 230, the shutter transistor 260, the storage transistor 240, and the transfer transistor 250 may be sequentially arranged in the first direction D1 on the conducting wire 210.

Referring to FIG. 3C, a pixel 200c may include the overflow transistor 220, the phototransistor 230, the storage transistor 240, the transfer transistor 250, and the shutter transistor 260, and the overflow transistor 220, the shutter transistor 260, the storage transistor 240, and the transfer transistor 250 may be sequentially arranged in a first direction D1 whereas the phototransistor 230 may be arranged along the overflow transistor 220 and the shutter transistor 260 in a second direction D2.

The pixels 200a and 200b respectively shown in FIGS. 3A and 3B may operate in a photogate signal modulation scheme or a photogate signal maintenance scheme. The photogate signal modulation scheme may include toggling a photogate signal during an integration period for collecting photocharges. The photogate signal modulation scheme may also be referred to as photogate modulation. The photogate signal maintenance scheme may include maintaining a photogate signal at a turn-on level during the integration period. The photogate signal maintenance scheme may also be referred to as a static photogate scheme. The pixel 200c shown in FIG. 3C may operate in the photogate signal maintenance scheme.

FIGS. 4A to 4E are respective equivalent circuit diagrams corresponding to pixels, according to example embodiments.

Figure 4A:
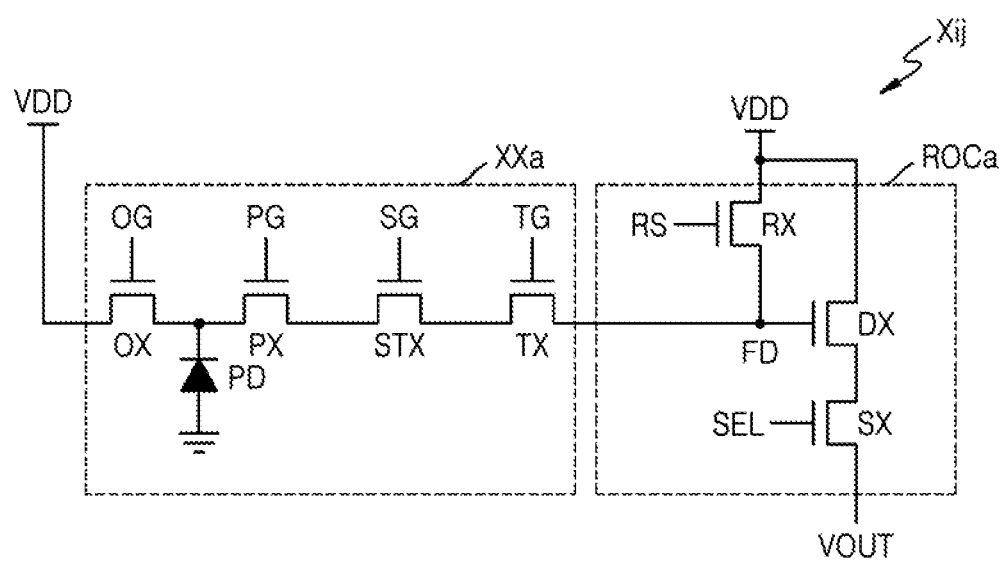
FIGS. 4A to 4E are respective equivalent circuit diagrams of a pixel, according to example embodiments.

Referring to FIG. 4A, in an example embodiment, a pixel Xij may include a sub-pixel XXa and a readout circuit ROCa.

The sub-pixel XXa may include an overflow transistor OX, a phototransistor PX, a photoelectric conversion element PD, a storage transistor STX, and a transfer transistor TX.

The overflow transistor OX may be connected between a conducting wire from which a positive power supply voltage VDD is supplied and the phototransistor PX. It will be understood that when an element is referred to as being "connected" to another element, it may be directly connected or electrically connected to the other element. The overflow transistor OX may prevent charges generated by the photoelectric conversion element PD from overflowing into the storage transistor STX.

The overflow transistor OX may be turned on or off according to a logic level of an overflow gate signal OG applied to a gate of the overflow transistor OX. When the overflow transistor OX is turned on, the positive power supply voltage VDD may be provided to the photoelectric conversion element PD. In an example embodiment, the overflow transistor OX may remove (or reset) photocharges accumulated in the photoelectric conversion element PD before an integration period begins. In an example embodiment, when the image sensor 1 operates as a distance sensor (or a depth sensor), a voltage opposite to a voltage of the phototransistor PX may be applied to the overflow transistor OX or the overflow transistor OX may be maintained at a constant voltage, and thus, an electron movement path may be changed based on a relative voltage difference.

The photoelectric conversion element PD may be connected to a node to which the overflow transistor OX and the phototransistor PX are electrically connected. The photoelectric conversion element PD may accumulate photocharges, e.g., photocharges generated due to reflected light that is incident thereto. The photoelectric conversion element PD may be implemented as, e.g., a photo-sensing element, such as a photodiode, a photogate, or a pinned photodiode (PPD).

In an example embodiment, a first end of the photoelectric conversion element PD may be connected to the node to which one electrode of the phototransistor PX and one electrode of the overflow transistor OX are connected. A second end of the photoelectric conversion element PD may be connected to a ground voltage.

The phototransistor PX may be connected between the overflow transistor OX and the storage transistor STX. The phototransistor PX may electrically connect the photoelectric conversion element PD to the storage transistor STX in response to the photogate signal PG. When the phototransistor PX is turned on, the photocharges accumulated in the photoelectric conversion element PD may be provided to the storage transistor STX.

In an example embodiment, the phototransistor PX may sequentially receive first to fourth photogate signals. In another example embodiment, the phototransistor PX may receive a photogate signal, which is previously determined according to a position of the sub-pixel XXa, from among the first to fourth photogate signals. Here, a position of the sub-pixel XXa may be represented by rows and columns in a pixel array having a matrix form.

The storage transistor STX may be connected between the phototransistor PX and the transfer transistor TX. The storage transistor STX may temporarily accumulate the photocharges accumulated in the photoelectric conversion element PD in response to a storage control signal SG.

The transfer transistor TX may be connected between the storage transistor STX and a floating diffusion node FD. The transfer transistor TX may transmit the photocharges accumulated in the storage transistor STX to the floating diffusion node FD in response to a transfer gate signal TG.

In an example embodiment, the transfer transistor TX may be included in the sub-pixel XXa. In another example embodiment, the transfer transistor TX may be included in the readout circuit ROCa.

The readout circuit ROCa may include a reset transistor RX, a driver transistor DX, and a selection transistor SX.

The reset transistor RX may be connected between a conducting wire from which a positive power supply voltage VDD is supplied and the floating diffusion node FD. The reset transistor RX may be turned on in response to a reset signal RS. When the reset transistor RX is turned on, the photocharges accumulated in the floating diffusion node FD may be reset.

The driver transistor DX may be connected between the conducting wire from which the positive power supply voltage VDD is supplied and the selection transistor SX. A gate electrode of the driver transistor DX may be connected to the floating diffusion node FD. The driver transistor DX may amplify and output a voltage of the floating diffusion node FD in response to a voltage applied to the floating diffusion node FD.

The selection transistor SX may be connected between the driver transistor DX and a conducting wire to which an output voltage VOUT is supplied. The selection transistor SX may be turned on in response to a selection signal SEL. The output voltage VOUT may be output from one electrode (e.g., a source electrode) of the selection transistor SX. One electrode (e.g., the source electrode) of the selection transistor SX may be electrically connected to a bit line. The output voltage VOUT may be provided as a pixel signal A'0, A'1, A'2 or A'3 through the bit line to a CDS/ADC circuit 34.

Figure 4B:
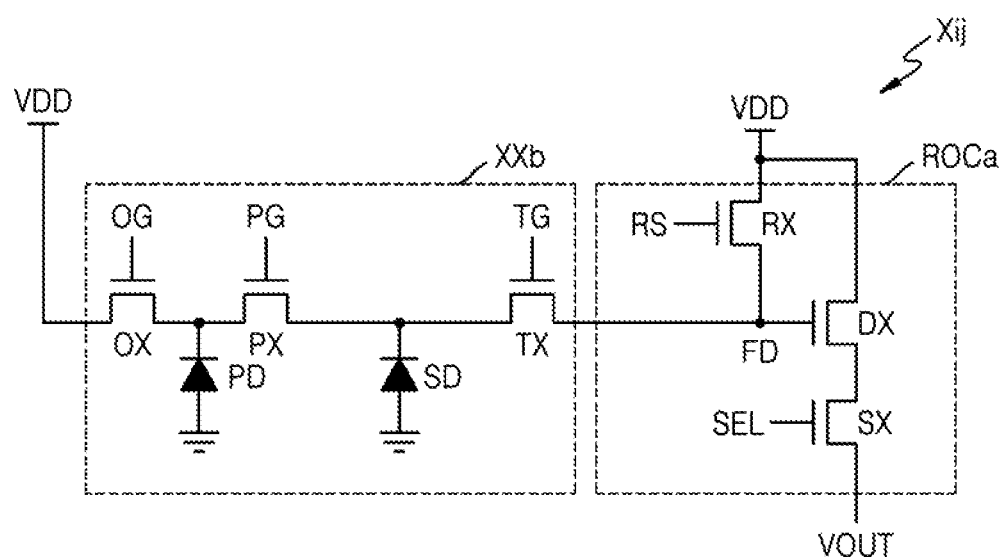

Referring to FIG. 4B, a storage diode SD may be used in a sub-pixel XXb, instead of the storage transistor STX shown in FIG. 4A.

A pixel Xij shown in FIG. 4B may include the sub-pixel XXb and a readout circuit ROCa.

The sub-pixel XXb may include an overflow transistor OX, a phototransistor PX, a photoelectric conversion element PD, a storage diode SD, and a transfer transistor TX. The overflow transistor OX, the phototransistor PX, the photoelectric conversion element PD, the transfer transistor TX, and the readout circuit ROCa may be the same as described above with reference to FIG. 4A.

The storage diode SD may be connected to a node to which the phototransistor PX and the transfer transistor TX are electrically connected. The storage diode SD may temporarily accumulate photocharges accumulated in the photoelectric conversion element PD.

The pixel Xij may include both the storage transistor STX and the storage diode SD. In this case, charges transmitted from the photoelectric conversion element PD may be stored in the storage diode SD through the storage transistor STX that is turned on. As used herein, the term "storage element" may refer to at least one of the storage transistor STX and the storage diode SD.

Figure 4C:
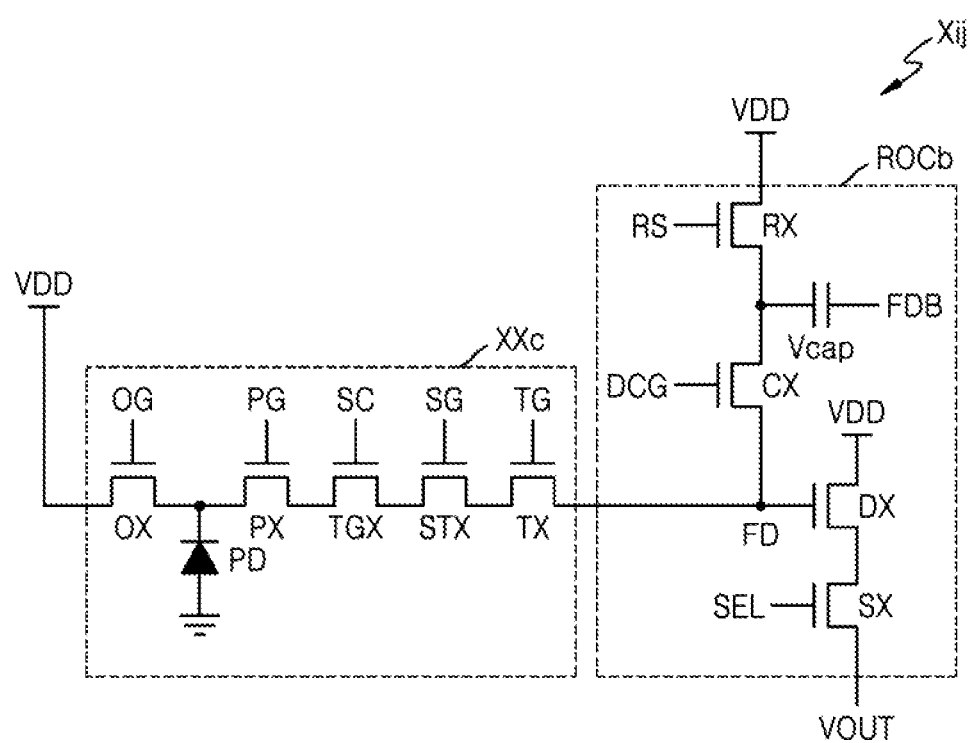

Referring to FIG. 4C, a pixel Xij shown in FIG. 4C may include a sub-pixel XXc and a readout circuit ROCb.

The sub-pixel XXc may include an overflow transistor OX, a phototransistor PX, a photoelectric conversion element PD, a shutter transistor TGX, a storage transistor STX, and a transfer transistor TX.

The shutter transistor TGX may be connected between the phototransistor PX and the storage transistor STX. The shutter transistor TGX may electrically connect the phototransistor PX to a storage element (e.g., the storage transistor STX) in response to a shutter control signal SC. Because the shutter transistor TGX is included in the pixel Xij shown in FIG. 4C, the performance of a global shutter operation may be improved. The global shutter operation will be described below with reference to FIG. 13.

In an implementation, the sub-pixel XXc may further include a storage diode included in the storage element (e.g., in the storage transistor STX) (not shown).

The readout circuit ROCb may include a reset transistor RX, a driver transistor DX, a selection transistor SX, a control transistor CX, and a capacitor Vcap.

The control transistor CX may be connected between a floating diffusion node FD and the reset transistor RX. The control transistor CX may electrically connect the floating diffusion node FD to the capacitor Vcap in response to a gain control signal DCG.

The capacitor Vcap may include a first terminal and a second terminal. The first terminal of the capacitor Vcap may be electrically connected to a node to which one electrode of the reset transistor RX and one electrode of the control transistor CX are electrically connected. The second terminal of the capacitor Vcap may be electrically connected to a conducting wire to which a boosting signal FDB is applied.

A gain of the pixel Xij may be controlled by adjusting a logic level of the gain control signal DCG and a capacitance of the capacitor Vcap.

In various implementations, the readout circuit ROCb may be included in the pixel Xij shown in each of FIGS. 4A and 4B.

Figure 4D:
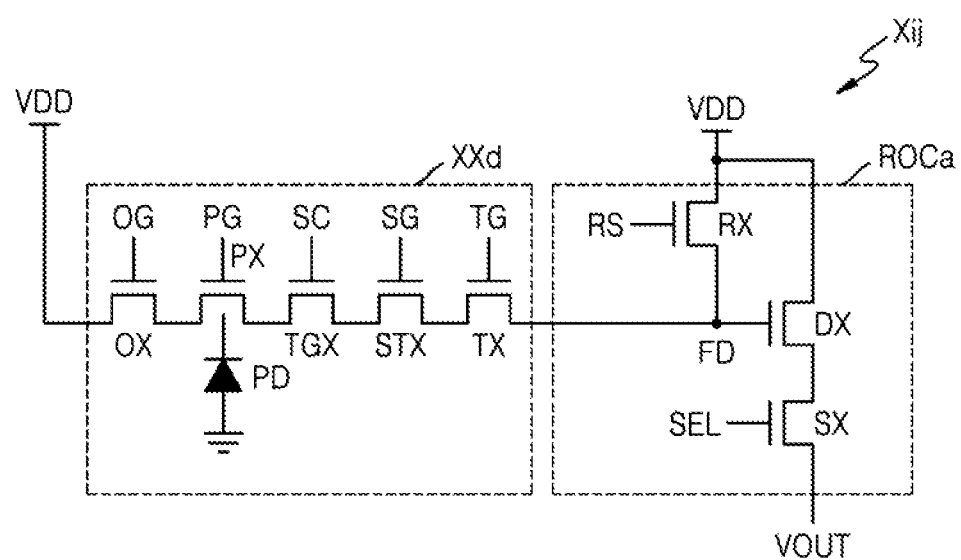

Referring to FIG. 4D, a pixel Xij may include a sub-pixel XXd and a readout circuit ROCa.

The sub-pixel XXd may include an overflow transistor OX, a phototransistor PX, a photoelectric conversion element PD, a shutter transistor TGX, a storage transistor STX, and a transfer transistor TX.

The photoelectric conversion element PD may be included in the photoelectric conversion region 170 (see, e.g., FIGS. 2A and 2B). The photoelectric conversion region 170 may sense light and generate electron-hole pairs due to the sensed light. Moreover, a depletion region may be formed under the phototransistor PX due to the photogate signal PG, and electrons may be separated from holes in the electron-hole pairs due to the depletion region, and accumulated under the phototransistor PX.

The transfer transistor TX may transmit electrons under the phototransistor PX to a floating diffusion node FD in response to a transmission signal TG.

In an implementation, a pixel structure from which the phototransistor PX is omitted may be applied to the pixel Xij (not shown).

Figure 4E:
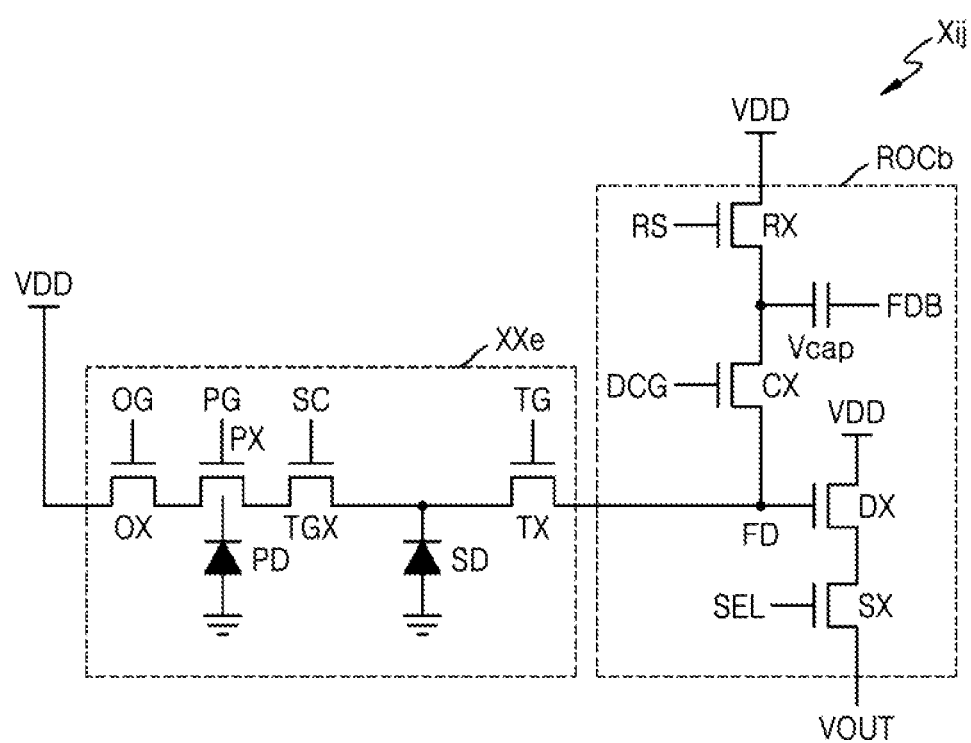

Referring to FIG. 4E, the pixel Xij may include a sub-pixel XXe and a readout circuit ROCb.

The sub-pixel XXe shown in FIG. 4E may include a storage diode SD instead of the storage transistor STX, unlike the sub-pixel XXd shown in FIG. 4D.

Figure 5:
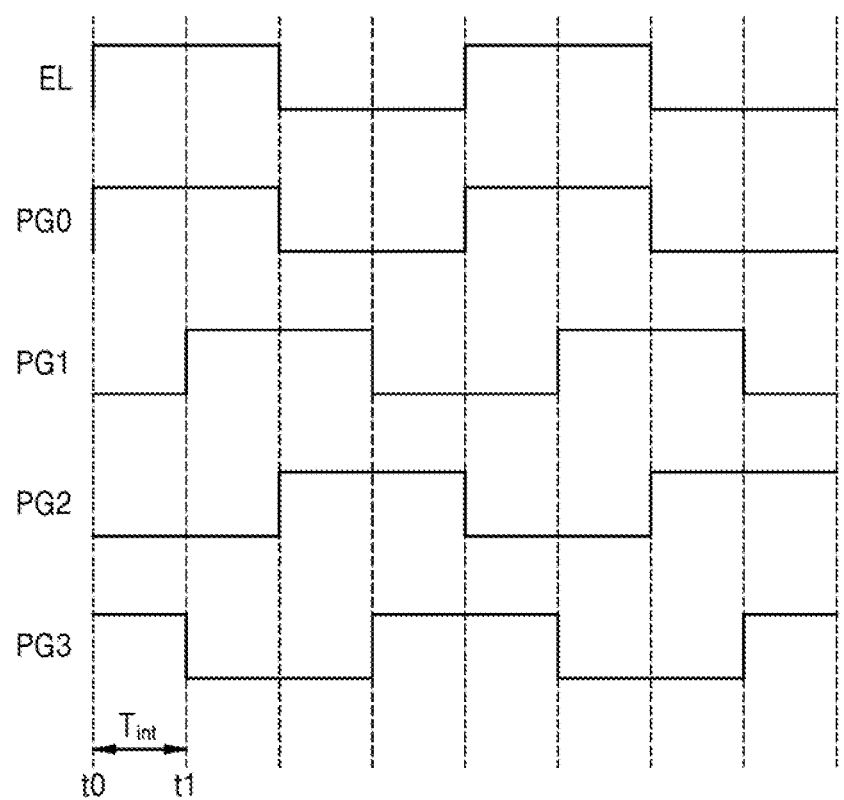
FIG. 5 is a diagram for explaining operations due to first to fourth photogate signals according to an example embodiment.
Figure 6:
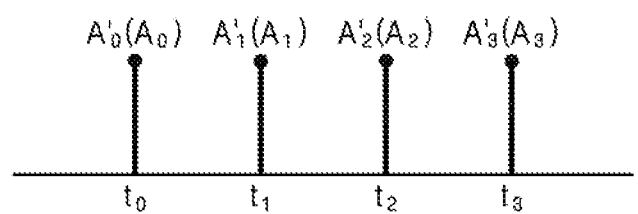
FIG. 6 is a diagram for explaining time points of pixel signals output by a pixel according to an example embodiment.

FIG. 5 is a diagram for explaining operations due to first to fourth photogate signals according to an example embodiment, and FIG. 6 is a diagram for explaining time points of pixel signals output by a pixel according to an example embodiment.

Referring to FIG. 5, in an example embodiment, modulated light EL may be a square wave signal. The first to fourth photogate signals PG0, PG1, PG2, and PG3 may be, e.g., square waves having respectively different phase differences. For example, the first photogate signal PG0 may be a signal having a phase difference of 0° with respect to the modulated light EL. The second photogate signal PG1 may be a signal having a phase difference of 90° with respect to the modulated light EL. The third photogate signal PG2 may be a signal having a phase difference of 180° with respect to the modulated light EL. The fourth photogate signal PG3 may be a signal having a phase difference of 270° with respect to the modulated light EL.

In an example embodiment, the first to fourth photogate signals PG0, PG1, PG2, and PG3 may be sequentially applied to the phototransistor PX included in one pixel Xij. The first to fourth photogate signals PG0, PG1, PG2, and PG3 may be sequentially applied with an integration time $T_{Int}$ therebetween. Accordingly, referring to FIG. 6, one pixel Xij may output a first pixel signal A'0 in response to the first photogate signal PG0 at a first time point $t_0$, output a second pixel signal A'1 in response to the second photogate signal PG1 at a second time point $t_1$, output a third pixel signal A'2 in response to the third photogate signal PG2 at a third time point $t_2$, and output a fourth pixel signal A'3 in response to the fourth photogate signal PG3 at a fourth time point $t_3$. A difference between time points may correspond to the integration time $T_{Int}$.

In another example embodiment, the first to fourth photogate signals PG0, PG1, PG2, and PG3 may be each simultaneously applied to a pixel group including first to fourth sub-pixels. For example, simultaneously, the first photogate signal PG0 may be applied to the first sub-pixel, the second photogate signal PG1 may be applied to the second sub-pixel, the third photogate signal PG2 may be applied to the third sub-pixel, and the fourth photogate signal PG3 may be applied to the fourth sub-pixel. Accordingly, the pixel group including the first to fourth sub-pixels may simultaneously output the first to fourth pixel signals A'0, A'1, A'2, and A'3 as described below with reference to FIG. 11.

An overflow gate signal OG having a logic level opposite to a logic level of the first to fourth photogate signals PG0, PG1, PG2, and PG3 may be applied to a gate of an overflow transistor OX. In another implementation, an overflow gate signal OG that is maintained at a constant logic level may be applied to the gate of the overflow transistor OX. When the overflow gate signal OG is maintained at the constant logic level, a direction in which electrons move may depend on a relative difference in logic level (or voltage) between the overflow gate signal OG and the first to fourth photogate signals PG0, PG1, PG2, and PG3.

Referring to FIG. 6, the first pixel signal A'0, the second pixel signal A'1, the third pixel signal A'2, and the fourth pixel signal A'3 may be expressed as in Equation 1:

$$A'_k = \sum_{n=1}^{N} a_{k,n} \qquad \text{[Equation 1]}$$

In Equation 1, $\alpha_{k,n}$ denotes a number of electrons generated in the pixel Xij when an n-th gate signal (n is a natural number) is applied with a phase difference corresponding to k. Also, $N = f_m * T_{Int}$, wherein $f_m$ denotes a frequency of the modulated light EL, and $T_{Int}$ denotes an integration time.

When a phase difference between the modulated light EL and the first photogate signal PG0 is 0°, k may be 0. When a phase difference between the modulated light EL and the second photogate signal PG1 is 90°, k may be 1. When a phase difference between the modulated light EL and the third photogate signal PG2 is 180°, k may be 2. When a phase difference between the modulated light EL and the fourth photogate signal PG3 is 270°, k may be 3.

The first to fourth pixel signals A'0, A'1, A'2, and A'3 may be briefly expressed as in Equation 2:

$A'_0 = \alpha + \beta \cos \theta$ $A'_1 = \alpha + \beta \sin \theta$ $A'_2 = \alpha - \beta \cos \theta$ $A'_3 = \alpha - \beta \sin \theta \qquad \text{[Equation 2]}$ In Equation 2, $\alpha$ denotes a background offset, and $\beta$ denotes a demodulation intensity. The demodulation intensity $\beta$ may denote the intensity of reflected light RL.

The first to fourth pixel signals A'0, A'1, A'2, and A'3 may be correlated double-sampled by a CDS/ADC circuit 34, converted into first to fourth digital pixel signals A0, A1, A2, and A3, and provided to a signal processor 36.

The signal processor 36 may calculate color information C by summing the first to fourth digital pixel signals A0, A1, A2, and A3, as shown in Equation 3 below. A color image of the pixel Xij may be determined by a color filter.

$C = A_0 + A_1 + A_2 + A_3 \qquad \text{[Equation 3]}$

Moreover, a phase difference $\hat{\theta}$ may be calculated as shown in Equation 4:

$$\hat{\theta} = 2\pi f_m t_\Delta = \tan^{-1} \frac{A_1 - A_3}{A_0 - A_2} \qquad \text{[Equation 4]}$$

A time difference $t_\Delta$ between the modulated light EL and the reflected light RL may be estimated by using a distance 'd' between the image sensor 1 and an object 2 and a luminous flux 'c' as shown in Equation 5:

$$t_\Delta = \frac{2d}{c} \qquad \text{[Equation 5]}$$

The signal processor 36 may calculate depth information $\hat{d}$ by using Equations 4 and 5, as shown in Equation 6:

$$\hat{d} = \frac{c}{4\pi f_m} \hat{\theta} \qquad \text{[Equation 6]}$$

The signal processor 36 may generate a color image and a depth image of the object 2 based on the color information C and depth information $\hat{d}$ about each pixel. Thus, the signal processor 36 may generate the color image of the object 2 by combining color information C about each of a plurality of pixels Xij (i=1 to n, j=1 to m), and generate the depth image of the object 2 by combining depth information $\hat{d}$ about each of a plurality of pixels Xij.

Figure 7:
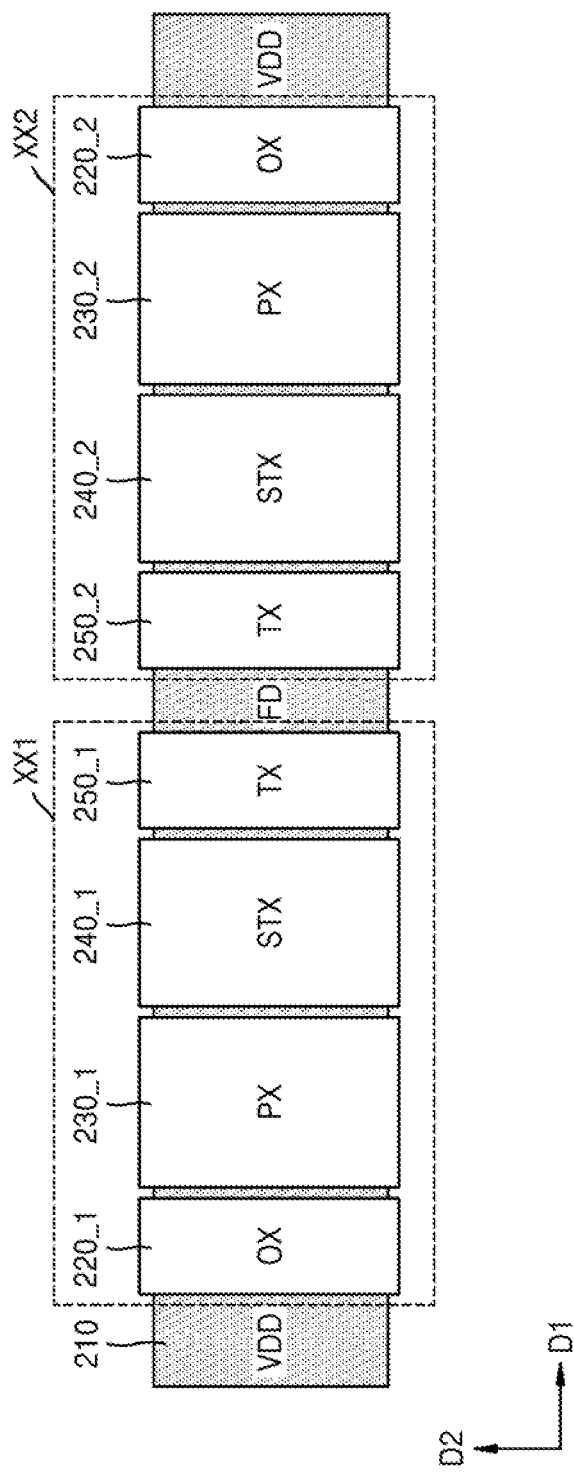
FIG. 7 illustrates the layout of a first sub-pixel XX1 and a second sub-pixel XX2, according to an example embodiment.

FIG. 7 illustrates the layout of a first sub-pixel XX1 and a second sub-pixel XX2, according to an example embodiment.

Referring to FIG. 7, the first sub-pixel XX1 may include a first overflow transistor 220_1 (OX), a first phototransistor 230_1 (PX), a first storage transistor 240_1 (STX), and a first transfer transistor 250_1 (TX). The first overflow transistor 220_1, the first phototransistor 230_1, the first storage transistor 240_1, and the first transfer transistor 250_1 may be sequentially arranged on a conducting wire 210 in a first direction D1.

The second sub-pixel XX2 may include a second overflow transistor 220_2, a second phototransistor 230_2, a second storage transistor 240_2, and a second transfer transistor 250_2. The second transfer transistor 250_2, the second storage transistor 240_2, the second phototransistor 230_2, and the second overflow transistor 220_2 may be sequentially arranged on the conducting wire 210 in the first direction D1.

A positive power supply voltage VDD may be supplied from one side surface of each of the first overflow transistor 220_1 and the second overflow transistor 220_2.

The first sub-pixel XX1 and the second sub-pixel XX2 may be included in one pixel group. The first sub-pixel XX1 and the second sub-pixel XX2 may be adjacent to each other. The first sub-pixel XX1 and the second sub-pixel XX2 may be symmetric to each other with respect to a floating diffusion node FD therebetween. In an example embodiment, the first sub-pixel XX1 and the second sub-pixel XX2 may be arranged in parallel in the first direction D1. In another example embodiment, the first sub-pixel XX1 and the second sub-pixel XX2 may be arranged in parallel in a second direction D2 perpendicular to the first direction D1 (not shown).

The first sub-pixel XX1 and the second sub-pixel XX2, which are adjacent to each other, may be electrically connected to each other through the floating diffusion node FD. For example, one electrode (e.g., a source electrode) of the first transfer transistor 250_1 and one electrode (e.g., a source electrode) of the second transfer transistor 250_2 may be electrically connected to each other through the floating diffusion node FD. Photocharges accumulated by each of the first sub-pixel XX1 and the second sub-pixel XX2 may be accumulated in the floating diffusion node FD.

A readout circuit (e.g., ROCa of FIG. 4A) may be electrically connected to the floating diffusion node FD. Thus, the first sub-pixel XX1 may be electrically connected to the second sub-pixel XX2 through the floating diffusion node FD.

Figure 8:
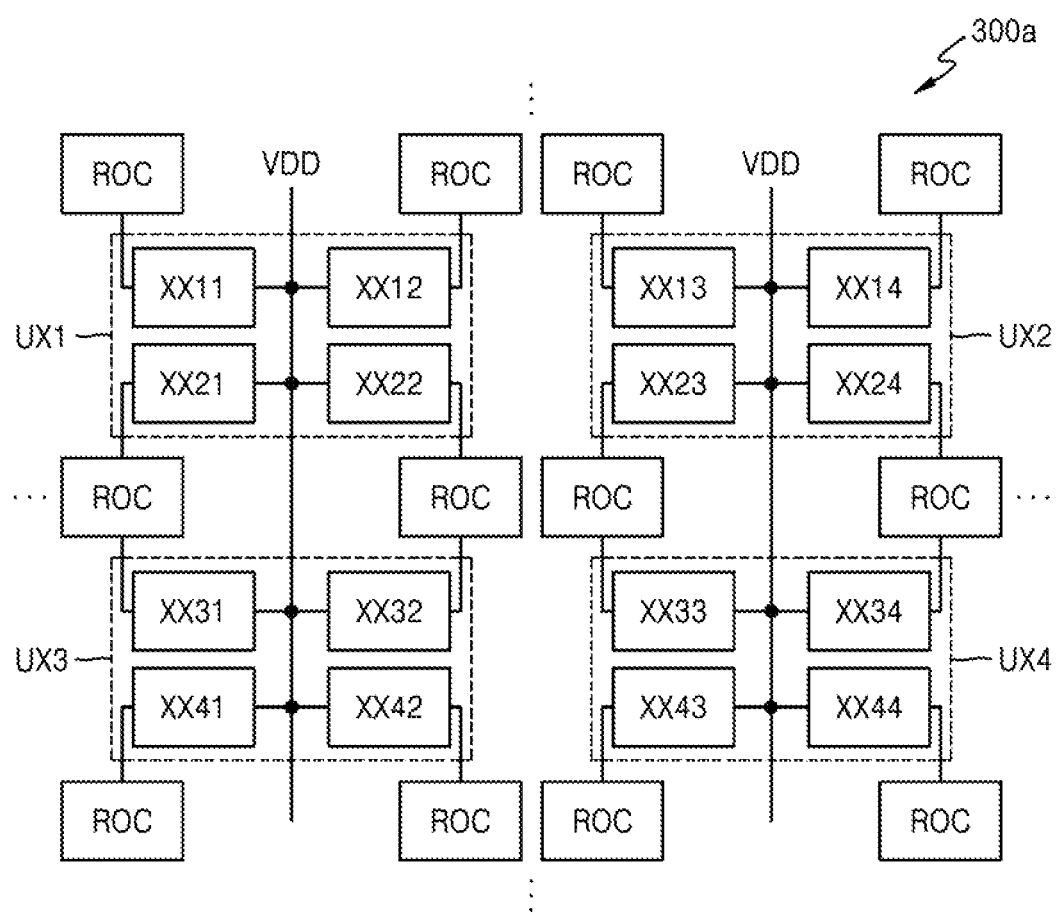
FIG. 8 is a diagram of a pixel array according to an example embodiment.

FIG. 8 is a diagram of a pixel array 300a according to an example embodiment.

In the description of the example embodiment shown in FIG. 8, the pixel array 300a may be assumed to include sixteen sub-pixels (e.g., first to sixteenth sub-pixels XX11 to XX44) arranged in a 4×4 matrix form.

Referring to FIG. 8, the pixel array 300a may include the first to sixteenth sub-pixels XX11 to XX44 and a plurality of readout circuits ROC. Each of the first to sixteenth sub-pixels XX11 to XX44 may have a sub-pixel structure, e.g., as described above with reference to FIGS. 4A to 4E. Each of the plurality of readout circuits ROC may have a readout circuit structure, e.g., as described above with reference to FIGS. 4A to 4G.

The first to sixteenth sub-pixels XX11 to XX44 may be divided into pixel groups according to preset criteria. For example, a first pixel group UX1 may include first, second, fifth, and sixth sub-pixels XX11, XX12, XX21, and XX22. A second pixel group UX2 may include third, fourth, seventh, and eighth sub-pixels XX13, XX14, XX23, and XX24. A third pixel group UX3 may include ninth, tenth, thirteenth, and fourteenth sub-pixels XX31, XX32, XX41, and XX42. A fourth pixel group UX4 may include eleventh, twelfth, fifteenth, and sixteenth sub-pixels XX33, XX34, XX43, and XX44.

One readout circuit ROC may be electrically connected to two adjacent sub-pixels in the same column, through a floating diffusion node FD. Thus, one readout circuit ROC may be shared between adjacent sub-pixels. For example, because the fifth sub-pixel XX21 and the ninth sub-pixel XX31 are adjacent to each other in the same column, one readout circuit ROC may be electrically connected between the fifth sub-pixel XX21 and the ninth sub-pixel XX31. In addition, one readout circuit ROC may be electrically connected between the sixth sub-pixel XX22 and the tenth sub-pixel XX32. In another implementation, one readout circuit ROC may be electrically connected to two adjacent sub-pixels in the same row (not shown).

A structure as described above, in which one read circuit ROC is shared between two adjacent sub-pixels, may be referred to as a 2-shared structure.

As described above, a size of a pixel array may be reduced by sharing a readout circuit, and an effect of integrating an image sensor may be obtained due to a reduction in the size of the pixel array.

Figure 9:
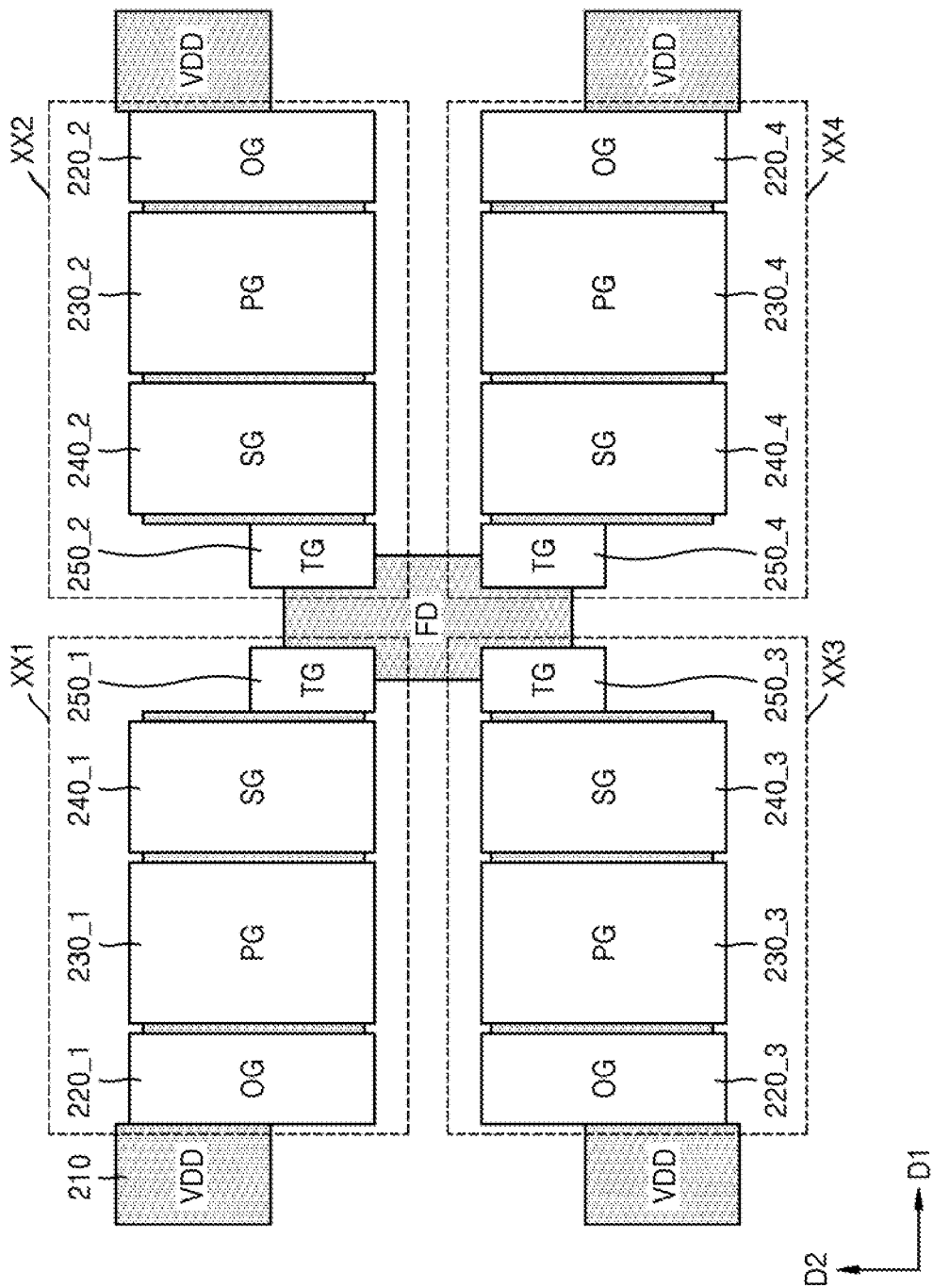
FIG. 9 illustrates the layout of first to fourth sub-pixels, according to an example embodiment.

FIG. 9 illustrates the layout of first to fourth sub-pixels, according to an example embodiment.

Referring to FIG. 9, a first sub-pixel XX1 and a second sub-pixel XX2 may be electrically connected to the same floating diffusion node FD as described above with reference to FIG. 7. A third sub-pixel XX3 and a fourth sub-pixel XX4 may be electrically connected to the same floating diffusion node FD. The third sub-pixel XX3 may include a third overflow transistor 220_3, a third phototransistor 230_3, a third storage transistor 240_3, and a third transfer transistor 250_3. The fourth sub-pixel XX4 may include a fourth overflow transistor 220_4, a fourth phototransistor 230_4, a fourth storage transistor 240_4, and a fourth transfer transistor 250_4. A positive power supply voltage VDD may be supplied from one side surface of each of the first to fourth overflow transistors 220_1, 220_2, 220_3, and 220_4.

The first to fourth sub-pixels XX1, XX2, XX3, and XX4 may be included in one pixel group. The first to fourth sub-pixels XX1, XX2, XX3, and XX4 may be symmetrical to each other with respect to the floating diffusion node FD. The first to fourth sub-pixels XX1, XX2, XX3, and XX4 may be adjacent to each other and electrically connected to each other through the floating diffusion node FD. For example, electrodes (e.g., source electrodes) of the first to fourth transfer transistors 240_1, 240_2, 240_3, and 240_4 may be electrically connected to each other through the floating diffusion node FD.

Because a readout circuit (e.g., ROCa of FIG. 4A) is electrically connected to the floating diffusion node FD, the first to fourth sub-pixels XX1, XX2, XX3, and XX4 may be electrically connected to each other through the floating diffusion node FD.

Figure 10:
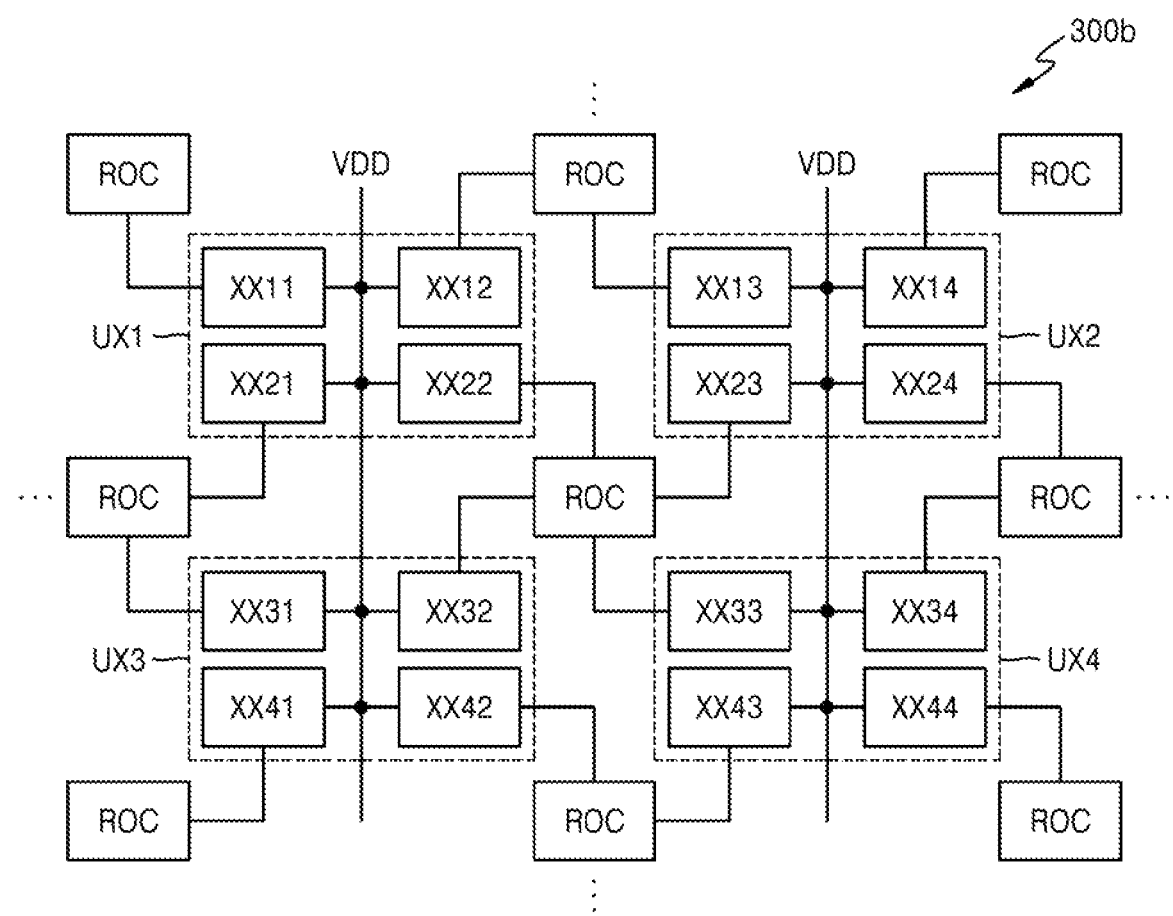
FIG. 10 is a diagram for explaining a connection relationship between a plurality of sub-pixels, according to an example embodiment.

FIG. 10 is a diagram for explaining a connection relationship between a plurality of sub-pixels, according to an example embodiment. In the description of the example embodiment shown in FIG. 10, a pixel array 300b may be assumed to include sixteen sub-pixels arranged in a 4×4 matrix form.

Referring to FIG. 10, the pixel array 300b may include first to sixteenth sub-pixels XX11 to XX44 and a plurality of readout circuits ROC.

The first to sixteenth sub-pixels XX11 to XX44 may be divided into first to fourth pixel groups UX1, UX2, UX3, and UX4.

One readout circuit ROC may be electrically connected to four adjacent sub-pixels through a floating diffusion node FD. For example, one readout circuit ROC may be shared among the sixth sub-pixel XX22, the seventh sub-pixel XX23, the tenth sub-pixel XX32, and the eleventh sub-pixel XX33. As described above, a structure in which one readout circuit ROC is shared among four adjacent sub-pixels may be referred to as a 4-shared structure.

A size of the pixel array 300b shown in FIG. 10 may be less than a size of the pixel array 300a shown in FIG. 8. Thus, according to the present example embodiment shown in FIG. 10, an image sensor may be further integrated.

Figure 11:
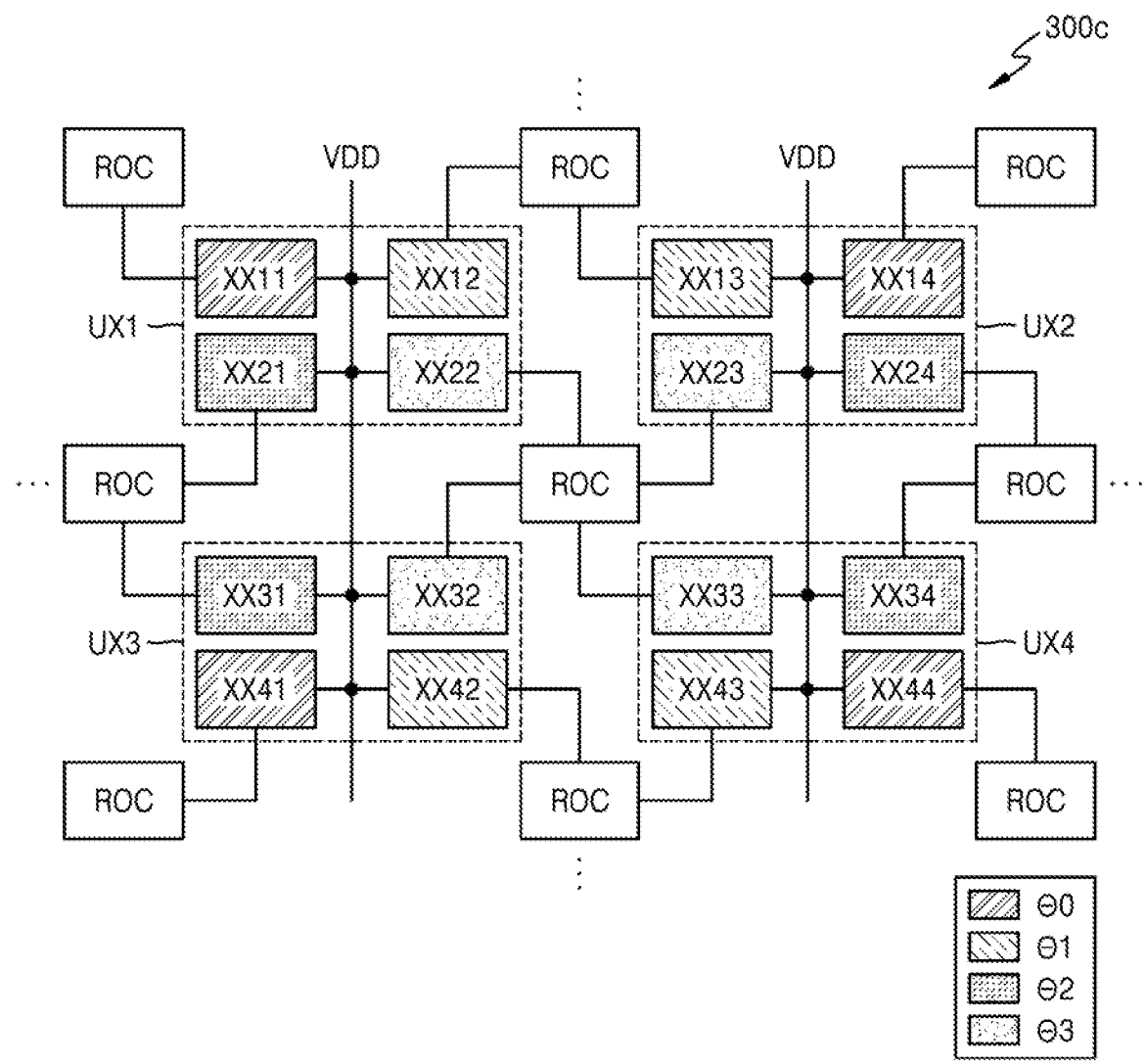
FIG. 11 is a diagram for explaining a plurality of photogate signals applied to a plurality of pixel groups according to an example embodiment.

FIG. 11 is a diagram for explaining a plurality of gate signals applied to a plurality of pixel groups, according to an example embodiment. In the description of the example embodiment shown in FIG. 11, a pixel array 300c may be assumed to be a 4-shared structure.

Referring to FIG. 11, the pixel array 300c may include first to fourth pixel groups UX1, UX2, UX3, and UX4 and a plurality of readout circuits ROC.

In an example embodiment, during an integration period, a photogate controller 32 may respectively provide first to fourth photogate signals, which are respectively different and have phase differences of 0°, 90°, 180°, and 270° with respect to modulated light, to a plurality of sub-pixels included in one pixel group.

For example, photogate signals having first to fourth phase differences θ0, θ1, θ2, and θ3 with respect to modulated light EL may be simultaneously provided to each pixel group. For example, in the case of the first pixel group UX1, a photogate signal having the first phase difference θ0 with respect to the modulated light EL may be applied to a first sub-pixel XX11, a photogate signal having the second phase difference θ1 with respect to the modulated light EL may be applied to a second sub-pixel XX12, a photogate signal having the third phase difference θ2 with respect to the modulated light EL may be applied to a fifth sub-pixel XX21, and a photogate signal having the fourth phase difference θ3 with respect to modulated light EL may be applied to a sixth sub-pixel XX22.

As another example, in the case of the second pixel group UX2, a photogate signal having the second phase difference θ1 with respect to the modulated light EL may be applied to a third sub-pixel XX13, a photogate signal having the first phase difference θ0 with respect to the modulated light EL may be applied to a fourth sub-pixel XX14, a photogate signal having the fourth phase difference θ3 with respect to the modulated light EL may be applied to a seventh sub-pixel XX23, and a photogate signal having the third phase difference θ2 with respect to the modulated light EL may be applied to an eighth sub-pixel XX24.

A pixel to which a photogate signal having a specific phase difference is to be applied may be preset according to a position of a sub-pixel. For example, the first phase difference θ0 may be 180° with respect to the modulated light EL, the second phase difference θ1 may be 270° with respect to the modulated light EL, the third phase difference θ2 may be 90° with respect to the modulated light EL, and the fourth phase difference θ3 may be 0° with respect to the modulated light EL.

A line to which the photogate signal having the first phase difference θ0 is applied may be connected to the first sub-pixel XX11, the fourth sub-pixel XX14, the thirteenth sub-pixel XX41, and the sixteenth sub-pixel XX44. A line to which the photogate signal having the second phase difference θ1 is applied may be connected to the second sub-pixel XX12, the third sub-pixel XX13, the fourteenth sub-pixel XX42, and the fifteenth sub-pixel XX43. A line to which the photogate signal having the third phase difference θ2 is applied may be connected to the fifth sub-pixel XX21, the eighth sub-pixel XX24, a ninth sub-pixel XX31, and a twelfth sub-pixel XX34. A line to which the photogate signal having the fourth phase difference θ3 is applied may be connected to the sixth sub-pixel XX22, the seventh sub-pixel XX23, a tenth sub-pixel XX32, and an eleventh sub-pixel XX33. In other implementations, a method of connecting a line to which a signal is applied to a sub-pixel may be variously selected according to a design method.

A method of simultaneously providing the photogate signals having the first to fourth phase differences θ0, θ1, θ2, and θ3 to each pixel group may be referred to as a phase mosaic method. When a depth image is generated by using the phase mosaic method, an operation time may be reduced as compared to a method of sequentially applying photogate signals having different phase differences to a pixel having a 1-tap structure.

FIGS. 12A to 12D are schematic timing diagrams of signals applied to pixels, according to an example embodiment.

Figure 12A:
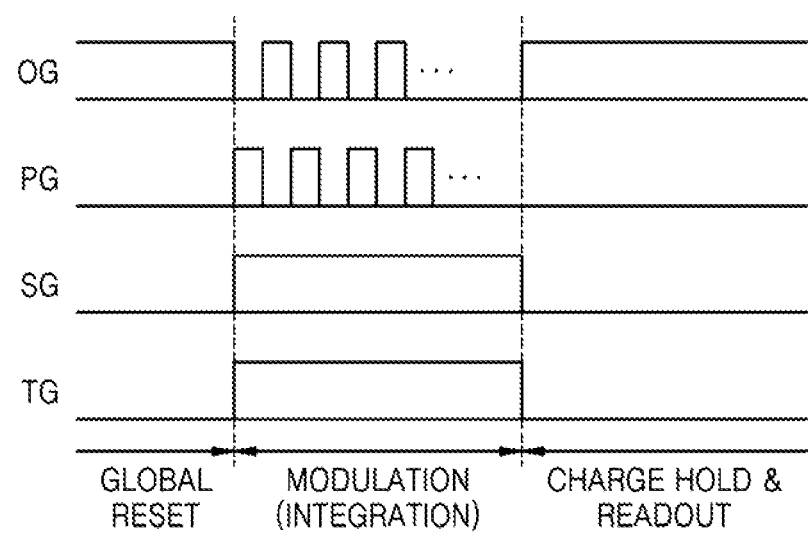
FIGS. 12A to 12D are schematic timing diagrams of signals applied to pixels, according to an example embodiment.
Figure 12B:
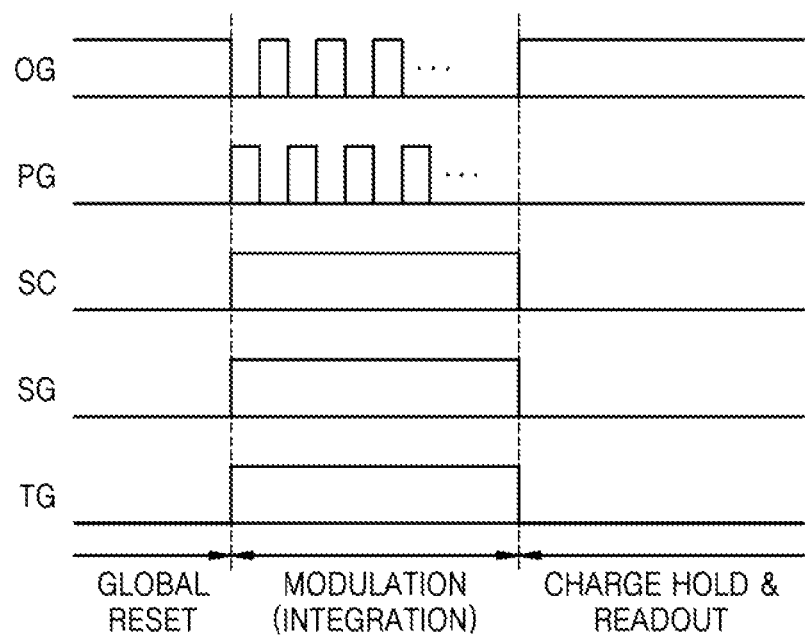
Figure 12C:
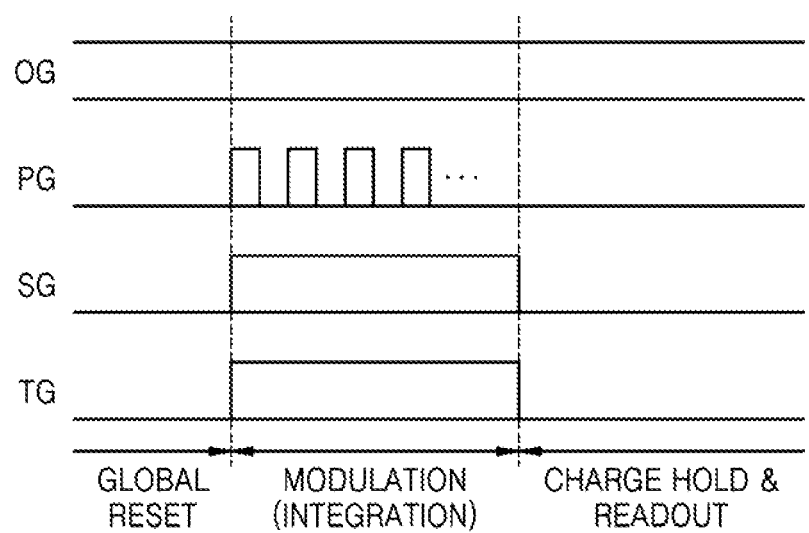
Figure 12D:
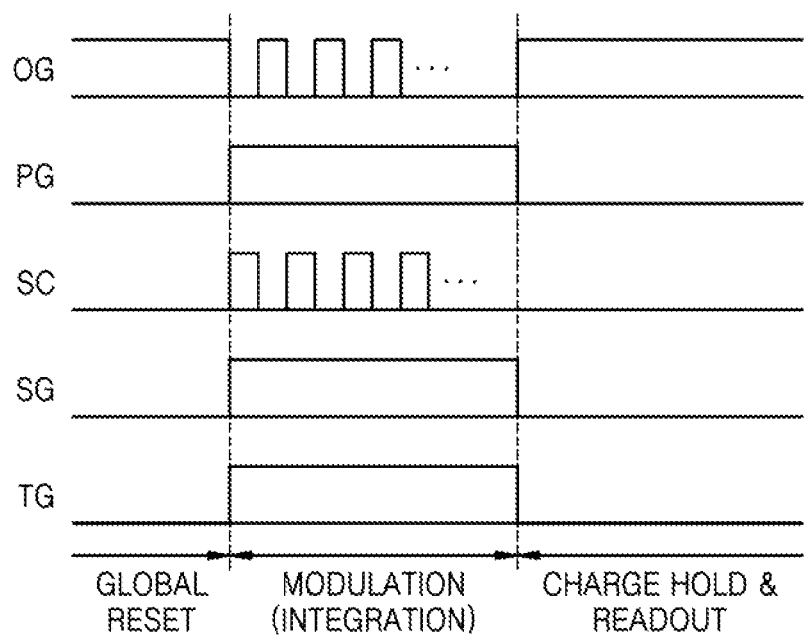

The embodiments shown in FIGS. 12A to 12D show time points of signals applied to one sub-pixel that operates according to a global shutter method. Specifically, the example embodiments shown in FIGS. 12A to 12C show time points of signals for acquiring a depth image using a photogate signal modulation scheme, and the example embodiment shown in FIG. 12D shows time points of signals for acquiring a depth image using a photogate signal maintenance scheme.

Referring to FIG. 12A, the global shutter method may include a global reset period GLOBAL RESET, a modulation period MODULATION (or an integration period INTEGRATION), and a charge hold & readout period CHARGE HOLD & READOUT.

During the global reset period GLOBAL RESET, an overflow gate signal OG may be at a turn-on level (e.g., a logic-high level). A photogate signal PG, a storage control signal SG, and a transfer gate signal TG may be at a turn-off level (e.g., a logic-low level). In another implementation, the storage control signal SG may be at a turn-on level (e.g., a logic-high level) according to a design method (not shown).

During the modulation period MODULATION or the integration period INTEGRATION, each of the overflow gate signal OG and the photogate signal PG may toggle, e.g., repeatedly, between a turn-on level and a turn-off level. A phase difference between the overflow gate signal OG and the photogate signal PG may be 180°. In an example embodiment, the photogate signal PG shown in FIG. 12A may be a signal, which is previously determined according to a position of a sub-pixel, and may be one photogate signal (e.g., the first photogate signal PG0) of the first to fourth photogate signals PG0, PG1, PG2, and PG3 described above with reference to FIG. 5.

During the charge hold & readout period CHARGE HOLD & READOUT, the overflow gate signal OG may be at a turn-on level. The photogate signal PG, the storage control signal SG, and the transfer gate signal TG may be at a turn-off level. In another implementation, the storage control signal SG may be at a turn-on level according to a design method (not shown).

The sub-pixel XXa shown in FIG. 4A may operate based on time points of the signals shown in FIG. 12A.

Referring to FIG. 12B, an overflow gate signal OG, a photogate signal PG, a storage control signal SG, and a transfer gate signal TG may be the same as described above with reference to FIG. 12A.

A sub-pixel (e.g., the sub-pixel XXc shown in FIG. 4C) may further include the shutter transistor TGX. A shutter control signal SC applied to the shutter transistor TGX may be at a turn-off level during a global reset period GLOBAL RESET, be at a turn-on level during a modulation period MODULATION (or an integration period INTEGRATION), and be at a turn-off level during a charge hold & readout period CHARGE HOLD & READOUT. According to the example embodiments shown in FIGS. 4C and 12B, the performance of a global shutter operation may be improved.

A magnitude (or amplitude) of a turn-on level of the overflow gate signal OG may be greater than a magnitude (or amplitude) of a turn-on level of the photogate signal PG and less than a magnitude (or amplitude) of a turn-on level of the shutter control signal SC.

Referring to FIG. 12C, the sub-pixel XXa shown in FIG. 4A may operate based on time points of signals shown in FIG. 12C.

A photogate signal PG, a storage control signal SG, and a transfer gate signal TG may be the same as described above with reference to FIG. 12A.

Unlike that which is described above with reference to FIG. 12A, an overflow gate signal OG may be at a turn-on level during a global reset period GLOBAL RESET, a modulation period MODULATION (or an integration period INTEGRATION), and a charge hold & readout period CHARGE HOLD & READOUT.

In another example embodiment, the photogate signal PG shown in FIG. 12C may include the first to fourth photogate signals PG0, PG1, PG2, and PG3, which are sequentially provided as described above with reference to FIG. 5.

Referring to FIG. 12D, an overflow gate signal OG, a storage control signal SG, and a transfer gate signal TG may be the same as described with reference to FIG. 12A.

The photogate signal PG may be at a turn-off level during the global reset period GLOBAL RESET, be at a turn-on level during the modulation period MODULATION (or the integration period INTEGRATION), and be at a turn-off level during the charge hold & readout period CHARGE HOLD & READOUT. In an example embodiment, the photogate signal PG may be at a turn-on level during the entire section (e.g., GLOBAL RESET, MODULATION, and CHARGE HOLD & READOUT).

A sub-pixel (e.g., the sub-pixel XXc shown in FIG. 4C) may further include the shutter transistor TGX.

In an example embodiment, a shutter control signal SC applied to the shutter transistor TGX may be previously determined according to a position of the sub-pixel and may be any one of first to fourth shutter control signals. For example, in the first pixel group UX1 shown in FIG. 11, during the modulation period MODULATION or the integration period INTEGRATION, a first shutter control signal having a phase difference of 0° with respect to modulated light EL may be applied to a first sub-pixel XX11, a second shutter control signal having a phase difference of 90° with respect to the modulated light EL may be applied to a second sub-pixel XX12, a third shutter control signal having a phase difference of 180° with respect to the modulated light EL may be applied to a fifth sub-pixel XX21, and a fourth shutter control signal having a phase difference of 270° with respect to the modulated light EL may be applied to a sixth sub-pixel XX22. In an example embodiment, each of the first to fourth shutter control signals may toggle, e.g., repeatedly, between a turn-on level and a turn-off level and have a phase difference of 180° with respect to the overflow gate signal OG.

In another example embodiment, the shutter control signal SC may include first to fourth shutter control signals having respectively different phase differences of 0°, 90°, 180°, and 270° with respect to the modulated light EL. In this case, the first to fourth shutter control signals may be applied to a gate of a phototransistor PX included in one sub-pixel (e.g., the sub-pixel XXd shown in FIG. 4E).

A magnitude (or amplitude) of a turn-on level of the shutter control signal SC may be greater than a magnitude (or amplitude) of a turn-on level of the photogate signal PG.

The overflow gate signal OG shown in FIG. 12D may be at a turn-on level during the modulation period MODULATION or the integration period INTEGRATION. In this case, the shutter control signal SC may toggle, e.g., repeatedly, between a turn-on level and a turn-off level.

Figure 13:
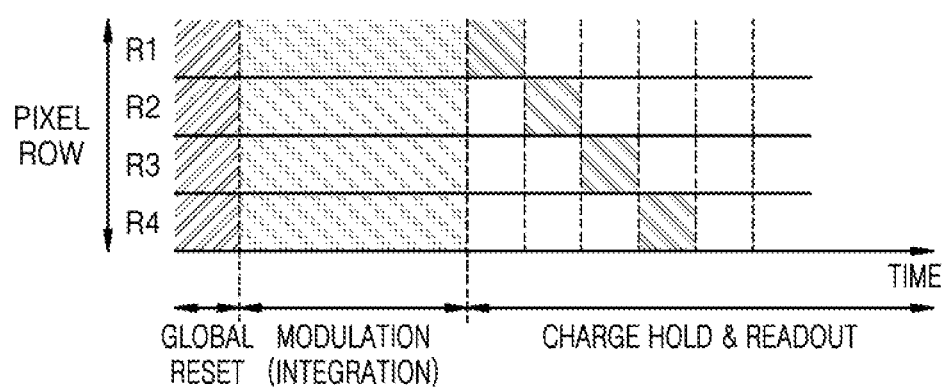
FIG. 13 is a diagram of a global shutter operation according to an example embodiment.

FIG. 13 is a diagram of a global shutter operation according to an example embodiment. In the description of the example embodiment shown in FIG. 13, a pixel array 33 may be assumed to include first to fourth pixel rows R1, R2, R3, and R4.

Referring to FIG. 13, a global shutter method may be divided into a global reset period GLOBAL RESET, a modulation period MODULATION (or the integration period INTEGRATION), and a charge hold & readout period CHARGE HOLD & READOUT.

The first to fourth pixel rows R1, R2, R3, and R4 may be simultaneously driven during the global reset period GLOBAL RESET and the modulation period MODULATION. A specific driving method may be the same as described above with reference to FIGS. 12A to 12D.

The first to fourth pixel rows R1, R2, R3, and R4 may be sequentially driven during the charge hold & readout period CHARGE HOLD & READOUT. For example, the first pixel row R1, the second pixel row R2, the third pixel row R3, and the fourth pixel row R4 may be sequentially driven. A specific driving method may be the same as described above with reference to FIGS. 12A to 12D.

In the global shutter method according to the present example embodiment, a phenomenon where a distorted image of a moving object is obtained (or the jello effect) may be prevented.

Figure 14A:
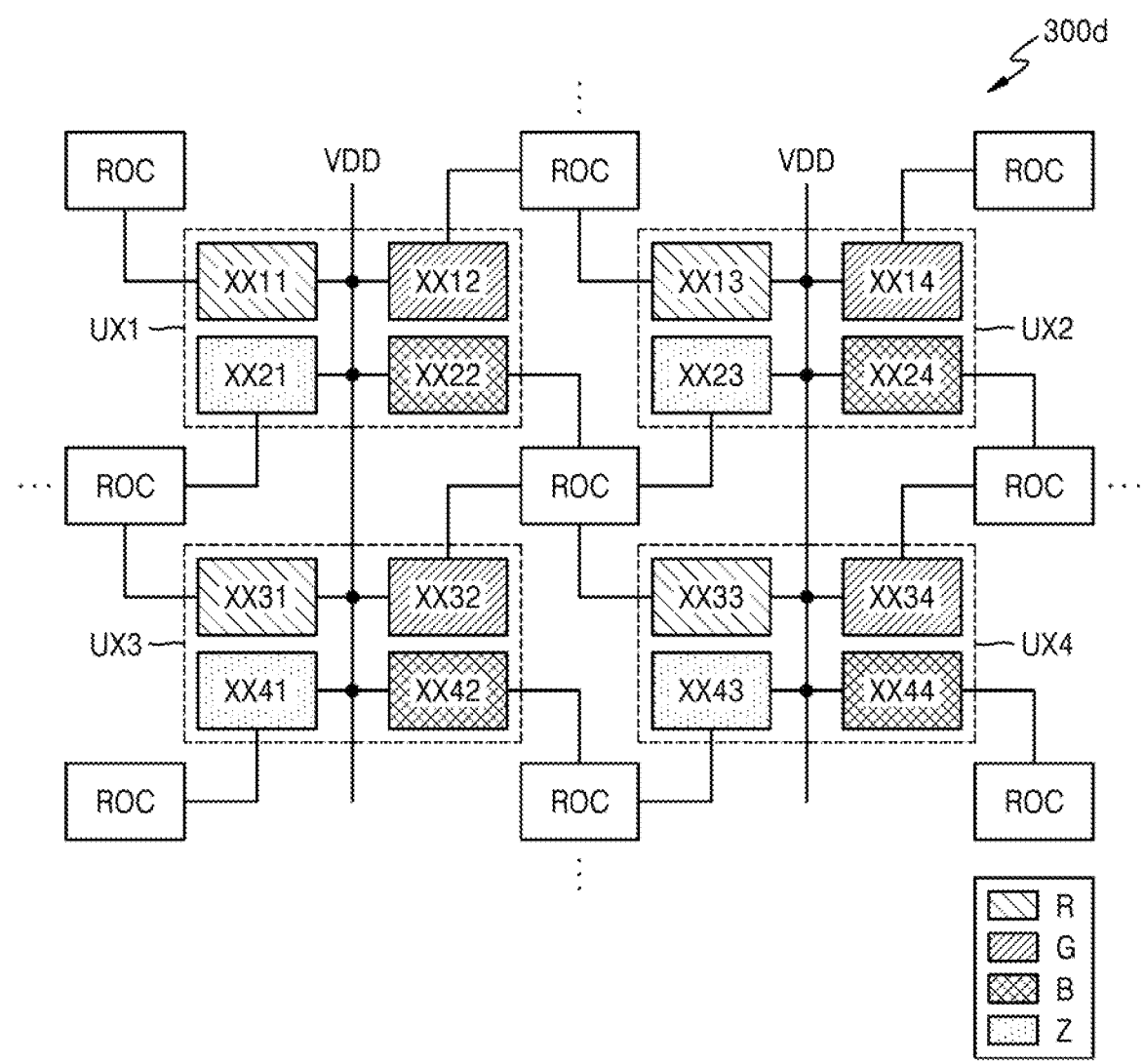
FIGS. 14A to 14C are diagrams for explaining a plurality of photogate signals applied to a plurality of pixel groups, according to an example embodiment.
Figure 14B:
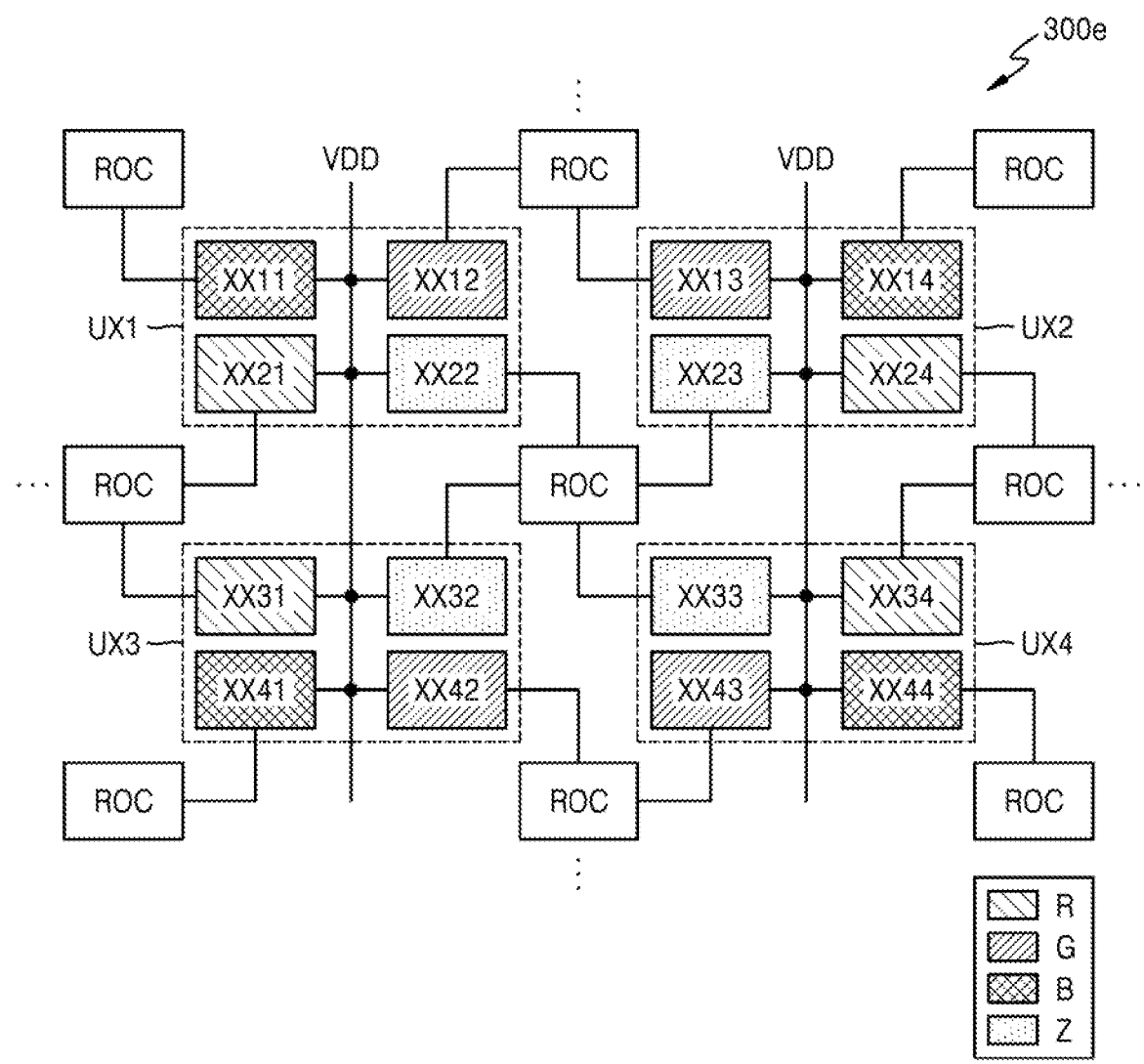
Figure 14C:
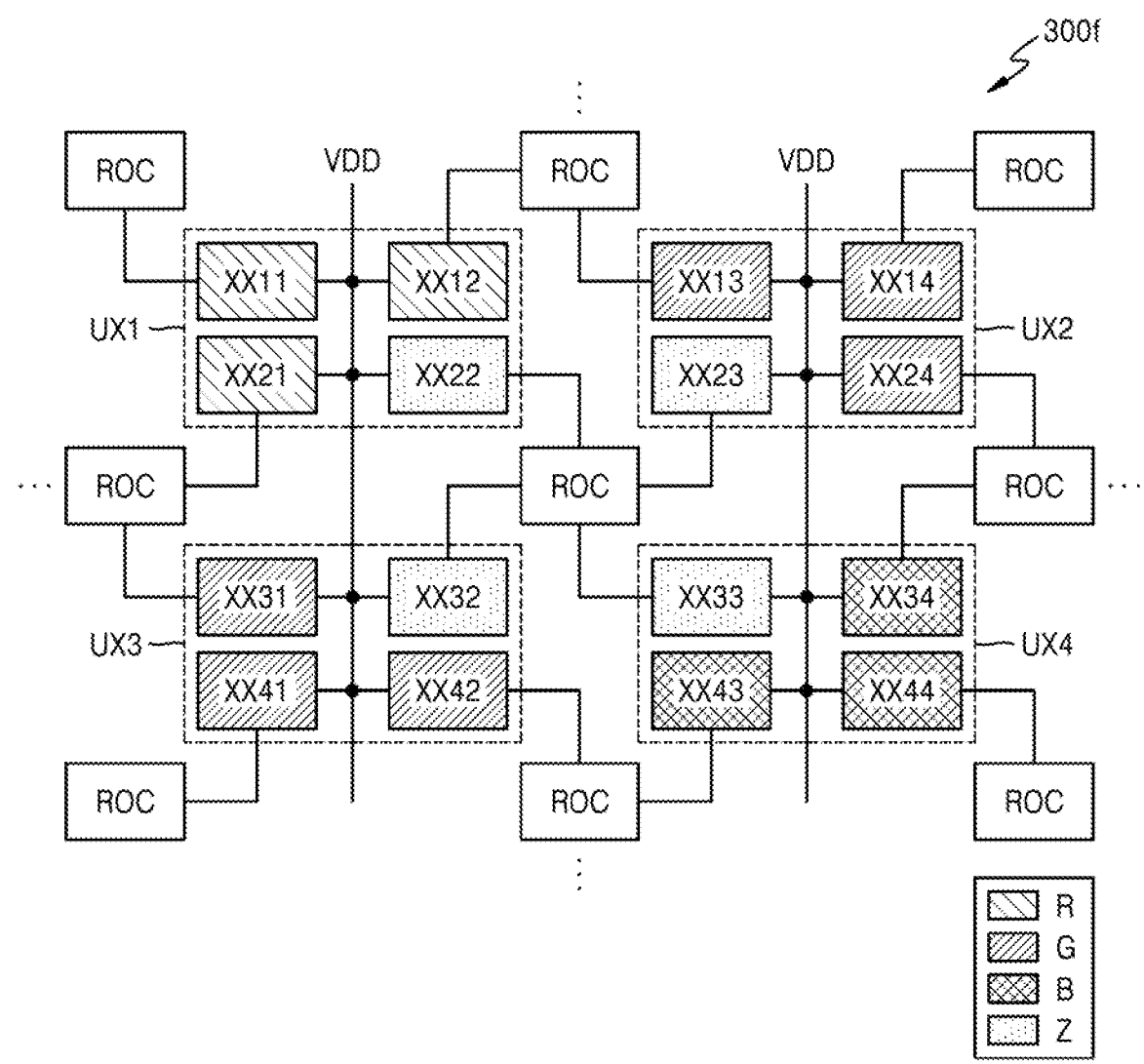

FIGS. 14A to 14C are diagrams for explaining a plurality of photogate signals applied to a plurality of pixel groups, according to an example embodiment.

Referring to FIGS. 1, 2A, 2B, and 14A, a color filter layer 120 may be partially on a pixel array 300d so that an image sensor 1 may acquire a color image. In the color filter layer 120, one color filter may be in each of first to sixteenth sub-pixels XX11 to XX44. Referring to the legend in FIG. 14A, a sub-pixel denoted by "R" may generate a red pixel signal for generating a color image about red, a sub-pixel denoted by "G" may generate a green pixel signal for generating a color image about green, and a sub-pixel denoted by "B" may generate a blue pixel signal for generating a color image about blue. The sub-pixels denoted by "R," "G," and "B" may be referred to as color pixels.

In an operation of acquiring the color image about red, reflected light RL may be incident to red pixels (e.g., XX11, XX13, XX31, and XX33), and first to fourth photogate signals may be sequentially applied to the red pixels (e.g., XX11, XX13, XX31, and XX33). In this case, the red pixels (e.g., XX11, XX13, XX31, and XX33) may respectively accumulate charges in response to the first to fourth photogate signals. The first to fourth red pixel signals may be sequentially output through a readout circuit ROC.

The red pixel signal may be expressed as in Equation 7:

$$A'_{0,R} = \alpha_R + \beta_R \cos \theta_R$$

$$A'_{1,R} = \alpha_R + \beta_R \sin \theta_R$$

$$A'_{2,R} = \alpha_R - \beta_R \cos \theta_R$$

$$A'_{3,R} = \alpha_R - \beta_R \sin \theta_R \qquad \text{[Equation 7]}$$

wherein $A'_{0,R}$ denotes the first red pixel signal, $A'_{1,R}$ denotes the second red pixel signal, $A'_{2,R}$ denotes the third red pixel signal, and $A'_{3,R}$ denotes the fourth red pixel signal. In Equation 7, a red color value of a sub-pixel may be extracted from a component of a background offset $\alpha_R$ or a component of a demodulation intensity $\beta_R$ by signal processing.

The first to fourth red pixel signals may be converted into first to fourth digital red pixel signals (not shown).

The signal processor 36 may calculate red color information $C_R$ as shown in Equation 8 by summating the first to fourth digital red pixel signals.

$$C_R = A_{0,R} + A_{1,R} + A_{2,R} + A_{3,R} \qquad \text{[Equation 8]}$$

wherein $A_{0,R}$ denotes a first digital red pixel signal, $A_{1,R}$ denotes a second digital red pixel signal, $A_{2,R}$ denotes a third digital red pixel signal, and $A_{3,R}$ denotes a fourth digital red pixel signal.

The signal processor 36 may estimate phase differences $\hat{\theta}R$ of the red pixels (e.g., XX11, XX13, XX31, and XX33), based on the first to fourth digital red pixel signals, as shown in Equation 9:

$$\hat{\theta}_R = 2\pi f_m t_{\Delta,R} = \tan^{-1} \frac{A_{1,R} - A_{3,R}}{A_{0,R} - A_{2,R}} \quad \text{[Equation 9]}$$

Accordingly, the signal processor 36 may calculate depth information dR about the red pixels (e.g., XX11, XX13, XX31, and XX33) as shown in Equation 10:

$$\hat{d}_R = \frac{c}{4\pi f_m} \hat{\theta}_R \quad \text{[Equation 10]}$$

Similarly, the signal processor 36 may calculate green color information $C_G$, phase difference $\hat{\theta}G$, and a depth information dG about green pixels (e.g., XX12, XX14, XX32, and XX34). In addition, the signal processor 36 may calculate blue color information $C_B$, phase difference $\hat{\theta}B$, and depth information $\hat{d}$ B about blue pixels (e.g., XX22, XX24, XX42, and XX44).

A color image may be an image in which three separate color values, e.g., a red color value, a green color value, and a blue color value, are combined.

Although a color pattern based on red, green, and blue is illustrated in FIG. 14A, other filter patterns may be used. For example, a CMY color pattern based on cyan color, magenta color, and yellow color may be applied.

In the pixel array 300d, a sub-pixel in which the color filter layer 120 is not arranged (i.e., a sub-pixel denoted by "Z") may generate a pixel signal for generating a depth image, and may be referred to as a distance pixel.

Any one of a plurality of readout circuits ROC shown in FIG. 14A may be connected to any one floating diffusion node (e.g., a floating diffusion node FD of FIG. 4A) FD, and a red pixel, a green pixel, a blue pixel, and a distance pixel may be also connected to the same floating diffusion node FD as described above. For example, one readout circuit ROC may be shared among the sixth sub-pixel XX22 serving as the blue pixel, the seventh sub-pixel XX23 serving as a distance pixel, the tenth sub-pixel XX32 serving as the green pixel, and the eleventh sub-pixel XX33 serving as the red pixel. Another readout circuit ROC of the plurality of readout circuits ROC may be connected to another floating diffusion node FD, and adjacent sub-pixels may be connected to the same floating diffusion node FD as described above. In an example embodiment, one readout circuit ROC may be shared among four sub-pixels shown in FIG. 14A, e.g., a red pixel, a green pixel, a blue pixel, and a distance pixel.

Referring to FIG. 14B, a pixel array 300e may be arranged in the form of a tetra RGBZ pattern. The tetra RGBZ pattern may be a pattern in which pixel groups, each of which includes three color pixels of different colors and one distance pixel, are repeatedly arranged and sub-pixels having the same characteristics are arranged adjacent to each other.

In the pixel array 300e, one readout circuit ROC may be shared among color pixels of the same color, and another readout circuit ROC may be shared among adjacent distance pixels. For example, one readout circuit ROC may be shared between the fifth sub-pixel XX21 and the ninth sub-pixel XX31, which are red pixels. In addition, one readout circuit ROC may be shared among the sixth sub-pixel XX22, the seventh sub-pixel XX23, the tenth sub-pixel XX32, and the eleventh sub-pixel XX33, which are distance pixels. One readout circuit ROC may be shared among green pixels, and one readout circuit ROC may be shared among blue pixels.

In an example embodiment, first to fourth photogate signals PG0, PG1, PG2, and PG3 may be sequentially applied to distance pixels (e.g., XX22, XX23, XX32, and XX33), respectively. In another implementation, as described above with reference to FIG. 11, the first to fourth photogate signals PG0, PG1, PG2, and PG3 may be simultaneously applied to distance pixels (e.g., XX22, XX23, XX32, and XX33), respectively.

Referring to FIG. 14C, a pixel array 300f may be referred to as a tetra Bayer RGB & tetra Z pattern. The tetra Bayer RGB & tetra Z pattern may be a pattern in which pixel groups, each of which includes three color pixels of the same color and one distance pixel, are repeatedly arranged, with the distance pixels arranged adjacent to each other.

In the pixel array 300f, one readout circuit ROC may be shared among one red pixel, two green pixels, and one blue pixel, and another readout circuit ROC may be shared among adjacent distance pixels. In an example embodiment, during an integration period INTEGRATION, the row decoder 31 may simultaneously provide first to fourth shutter control signals having respectively different phase differences of 0°, 90°, 180°, and 270° with respect to modulated light EL to distance pixels (e.g., the sixth sub-pixel XX22, the seventh sub-pixel XX23, the tenth sub-pixel XX32, and the eleventh sub-pixel XX33), respectively. For example, the first shutter control signal may be applied to the sixth sub-pixel XX22, the second shutter control signal may be applied to the seventh sub-pixel XX23, the third shutter control signal may be applied to the tenth sub-pixel XX32, and the third shutter control signal may be applied to the eleventh sub-pixel XX33.

Figure 15A:
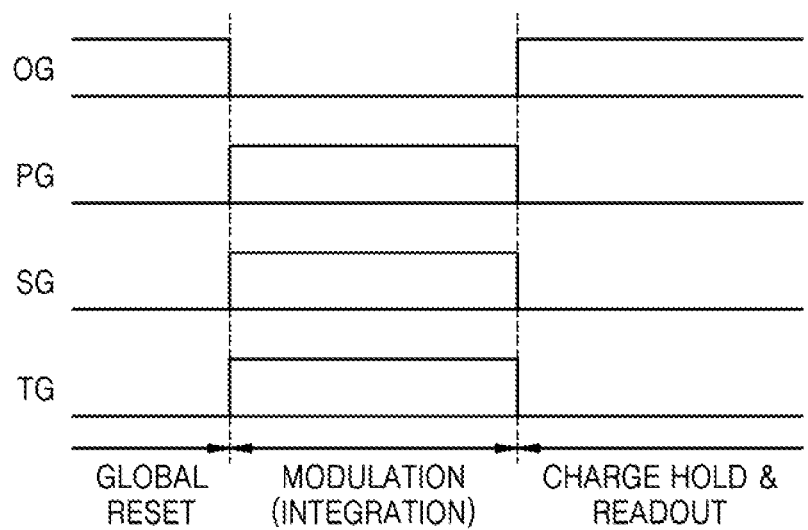
FIGS. 15A to 15C are schematic timing diagrams of signals applied to pixels, according to an example embodiment.
Figure 15B:
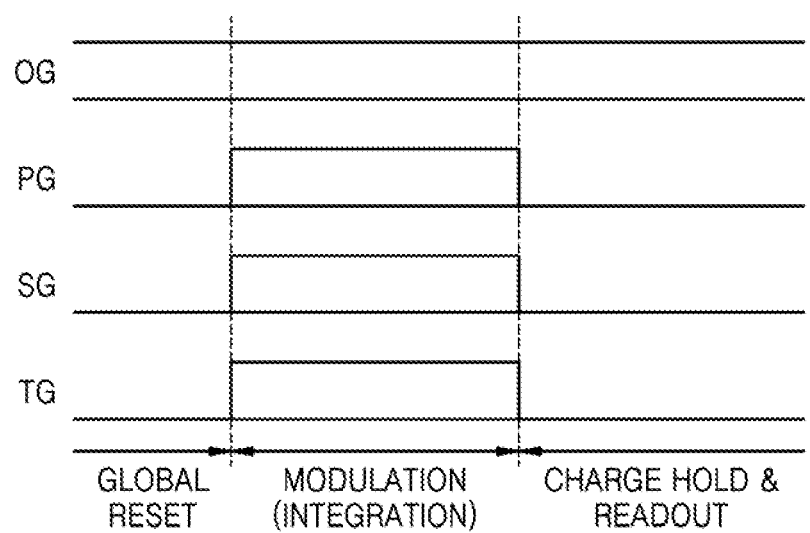
Figure 15C:
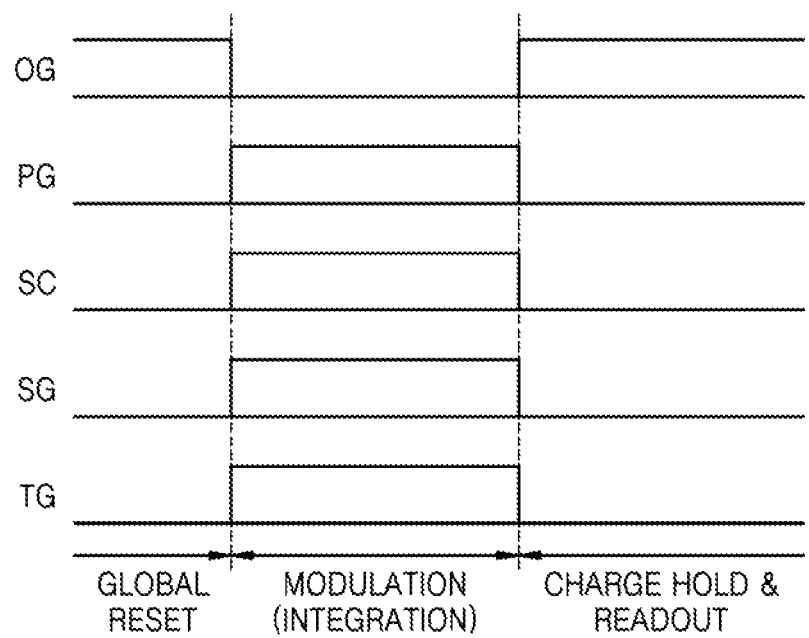

FIGS. 15A to 15C are schematic timing diagrams of signals applied to pixels, according to an example embodiment. Specifically, FIGS. 15A to 15C show time points of signals for acquiring color images by using a global shutter method.

Referring to FIG. 15A, a storage control signal SG and a transfer gate signal TG may be the same as described above with reference to FIG. 12A.

An overflow gate signal OG may be at a turn-on level during a global reset period GLOBAL RESET, be at a turn-off level during a modulation period MODULATION or an integration period INTEGRATION, and be at a turn-on level during a charge hold & readout period CHARGE HOLD & READOUT. The overflow gate signal OG may be at an inverted logic level of a logic level of the photogate signal PG.

The photogate signal PG may be at a turn-off level during the global reset period GLOBAL RESET, be at a turn-on level during the modulation period MODULATION or the integration period INTEGRATION, and be at a turn-off level during the charge hold & readout period CHARGE HOLD & READOUT.

Referring to FIG. 15B, an overflow gate signal OG, a storage control signal SG, and a transfer gate signal TG may be the same as described above with reference to FIG. 12C. The photogate signal PG may be the same as described above with reference to FIG. 15A.

Referring to FIG. 15C, a sub-pixel (e.g., the sub-pixel XXc shown in FIG. 4C or the sub-pixel XXd shown in FIG. 4D) may further include a shutter transistor TGX. A shutter control signal SC applied to the shutter transistor TGX may be at a turn-off level during a global reset period GLOBAL RESET, be at a turn-on level during a modulation period MODULATION or an integration period INTEGRATION, and be at a turn-off level during a charge hold & readout period CHARGE HOLD & READOUT.

The sub-pixel XXa shown in FIG. 4A may operate based on time points of the signals shown in FIG. 15A or time points of the signals shown in FIG. 15B. The sub-pixel XXc shown in FIG. 4C and the sub-pixel XXd shown in FIG. 4D may operate based on time points of signals shown in FIG. 15C.

Figure 16:
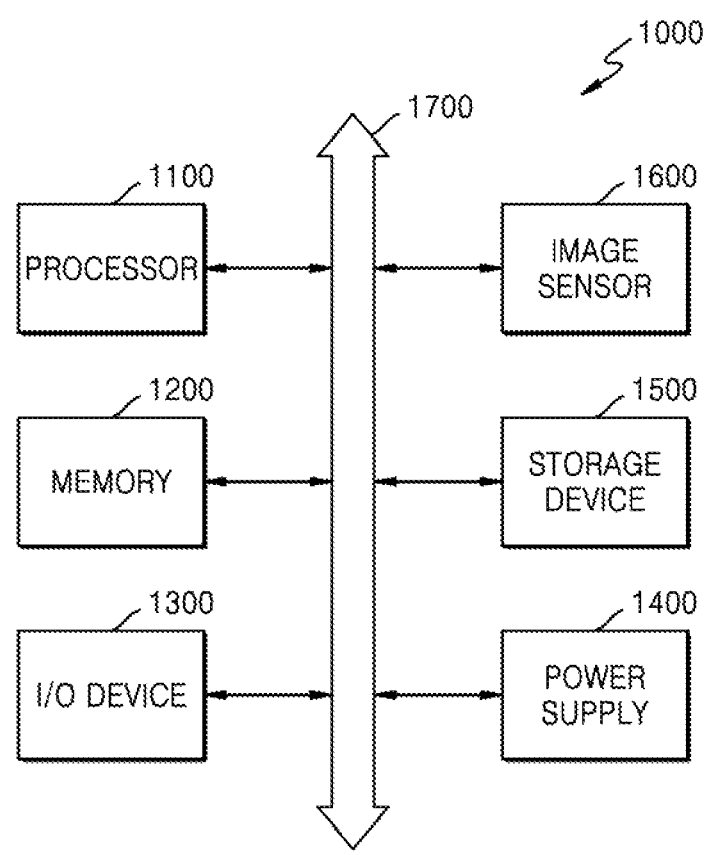
FIG. 16 is a schematic block diagram of a computer system including an image sensor, according to an example embodiment.

FIG. 16 is a schematic block diagram of a computer system 1000 including an image sensor, according to an example embodiment.

Referring to FIG. 16, the computer system 1000 may include a processor 1100, a memory 1200, an input/output (I/O) device 1300, a power supply 1400, a storage device 1500, an image sensor 1600, and a system bus 1700. The processor 1100, the memory 1200, the I/O device 1300, the power supply 1400, the storage device 1500, and the image sensor 1600 may communicate with each other through the system bus 1700.

The processor 1100 may be implemented as a microprocessor, a CPU, any other type of control circuit (e.g., an application-specific integrated circuit (ASIC)), or an application processor (AP).

The memory 1200 may be implemented as a volatile memory and/or a non-volatile memory.

The I/O device 1300 may include an input unit, such as a keyboard, a keypad, and a mouse, and an output unit, such as a printer and a display.

The power supply 1400 may supply an operating voltage used for an operation of the computer system 1000.

The storage device 1500 may include a solid state drive (SSD), a hard disk drive (HDD), and/or a compact-disc read-only memory (CD-ROM).

The image sensor 1600 may be the same as the image sensor 1 shown in FIG. 1.

By way of summation and review, a technique of simultaneously capturing a color image and a depth image (or a distance image) may be useful for images, e.g., stereoscopic images.

As described above, embodiments may provide a pixel array including pixels that have a 1-tap structure and share a readout circuit therebetween, and an image sensor that includes the pixel array and provides a color image and a depth image using the pixel array.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A pixel array, comprising:
a plurality of sub-pixels adjacent to each other and a readout circuit connected to the plurality of sub-pixels through a floating diffusion node, wherein:
each of the plurality of sub-pixels includes:
a photoelectric conversion element configured to accumulate photocharges generated due to reflected light that is incident thereto;
an overflow transistor connected to the photoelectric conversion element;
a phototransistor connected to the photoelectric conversion element and the overflow transistor; and
a storage element connected to the phototransistor wherein the phototransistor is configured to provide the photocharges accumulated in the photoelectric conversion element to the storage element, and
the readout circuit includes:
a reset transistor connected to the floating diffusion node;
a driver transistor including a gate electrode connected to the floating diffusion node; and
a selection transistor connected to the driver transistor.

2. The pixel array as claimed in claim 1, wherein:
the plurality of sub-pixels include a first sub-pixel and a second sub-pixel adjacent to the first sub-pixel in a same row or column as the first sub-pixel, and
the first sub-pixel and the second sub-pixel are connected to the floating diffusion node.

3. The pixel array as claimed in claim 2, wherein:
the plurality of sub-pixels further include a third sub-pixel adjacent to the first sub-pixel and a fourth sub-pixel adjacent to the second sub-pixel and the third sub-pixel, and
the first sub-pixel, the second sub-pixel, the third sub-pixel, and the fourth sub-pixel are connected to the floating diffusion node.

4. The pixel array as claimed in claim 1, wherein a first end of the photoelectric conversion element is connected to the phototransistor and the overflow transistor, and a second end of the photoelectric conversion element is connected to a ground voltage.

5. The pixel array as claimed in claim 1, wherein each of the plurality of sub-pixels further includes a shutter transistor connected between the phototransistor and the storage element.

6. The pixel array as claimed in claim 1, wherein the storage element includes at least one of:
a storage transistor connected between the phototransistor and the floating diffusion node, or
a storage diode electrically connected to the phototransistor between the phototransistor and the floating diffusion node.

7. The pixel array as claimed in claim 1, wherein the readout circuit further includes:
a capacitor; and
a control transistor electrically connected to the floating diffusion node, the control transistor being configured to electrically connect the floating diffusion node to the capacitor in response to a gain control signal.

8. An image sensor, comprising:
a row decoder configured to generate an overflow gate signal;
a pixel array including first to fourth sub-pixels; and
a photogate controller configured to provide a plurality of photogate signals to the first to fourth sub-pixels, wherein:
each of the first to fourth sub-pixels includes:
a photoelectric conversion element configured to accumulate photocharges generated due to reflected light that is reflected by an object;
a storage element configured to accumulate the photocharges accumulated in the photoelectric conversion element;
an overflow transistor configured to provide a power supply voltage to the photoelectric conversion element in response to the overflow gate signal; and
a phototransistor configured to electrically connect the photoelectric conversion element to the storage element in response to a photogate signal that is previously determined according to a position of a sub-pixel, from among the plurality of photogate signals, and the photogate controller provides first to fourth photogate signals having respectively different phase differences of 0°, 90°, 180°, and 270° with respect to modulated light incident to the object to the first to fourth sub-pixels, respectively, during an integration period.

9. The image sensor as claimed in claim 8, wherein:

the overflow gate signal toggles between a turn-on level and a turn-off level during the integration period, and the photogate signal that is previously determined according to the position of the sub-pixel toggles with a phase difference of 180° with respect to the overflow gate signal, during the integration period.

10. The image sensor as claimed in claim 9, wherein:

each of the first to fourth sub-pixels further includes a shutter transistor configured to electrically connect the phototransistor to the storage element in response to a shutter control signal, and the shutter control signal is at a turn-on level during the integration period.

11. The image sensor as claimed in claim 8, wherein the overflow gate signal is at a turn-on level during the integration period.

12. The image sensor as claimed in claim 8, wherein:

the storage element includes a storage transistor configured to accumulate the photocharges accumulated in the photoelectric conversion element, in response to a storage control signal, and the storage control signal is at a turn-on level during the integration period.

13. An image sensor, comprising:

a row decoder configured to generate an overflow gate signal and a shutter control signal;

a photogate controller configured to generate a photogate signal;

a pixel array including first sub-pixels connected to a first floating diffusion node, a first readout circuit connected to the first floating diffusion node, second sub-pixels connected to a second floating diffusion node, and a second readout circuit connected to the second floating diffusion node; and a signal processor configured to generate a color image and a depth image of an object, based on a plurality of pixel signals output by the pixel array, wherein:

at least one of the first sub-pixels includes a color pixel configured to generate a pixel signal for the color image, and at least one of the second sub-pixels includes a distance pixel configured to generate a pixel signal for the depth image, each of the color pixel and the distance pixel includes:

a photoelectric conversion element configured to accumulate photocharges generated due to reflected light reflected from the object;

a storage element configured to accumulate photocharges accumulated in the photoelectric conversion element;

an overflow transistor configured to provide a power supply voltage to the photoelectric conversion element in response to the overflow gate signal;

a phototransistor configured to provide the photocharges accumulated in the photoelectric conversion element, to the storage element, in response to the photogate signal; and a shutter transistor configured to electrically connect the phototransistor to the storage element in response to the shutter control signal, and the photogate signal is at a turn-on level during an integration period.

14. The image sensor as claimed in claim 13, wherein the first sub-pixels include first to third color pixels of different colors and a distance pixel, and the second sub-pixels include first to third color pixels of different colors and a distance pixel.

15. The image sensor as claimed in claim 13, wherein:

the first sub-pixels include color pixels, at least two of the color pixels include color pixels of a same color, and the second sub-pixels include distance pixels.

16. The image sensor as claimed in claim 15, wherein:

the row decoder is configured to simultaneously provide first to fourth shutter control signals having respectively different phase differences of 0°, 90°, 180°, and 270° with respect to modulated light, which is incident to the object, to the second sub-pixels, respectively, during the integration period, and the second sub-pixels include a first distance pixel configured to receive the first shutter control signal, a second distance pixel configured to receive the second shutter control signal, a third distance pixel configured to receive the third shutter control signal, and a fourth distance pixel configured to receive the fourth shutter control signal.

17. The image sensor as claimed in claim 13, wherein:

the overflow gate signal toggles between a turn-on level and a turn-off level during the integration period, and the shutter control signal toggles with a phase difference of 180° with respect to the overflow gate signal during the integration period.

18. The image sensor as claimed in claim 13, wherein:

the overflow gate signal is at a turn-on level during the integration period, and the shutter control signal toggles between a turn-on level and a turn-off level during the integration period.

19. The image sensor as claimed in claim 13, wherein the shutter control signal is at a turn-on level during the integration period.

20. The image sensor as claimed in claim 19, wherein the overflow gate signal maintains a turn-off level during the integration period.

* * * * *